(12) United States Patent
Banno et al.

(10) Patent No.: US 6,801,996 B2
(45) Date of Patent: Oct. 5, 2004

(54) INSTRUCTION CODE CONVERSION UNIT AND INFORMATION PROCESSING SYSTEM AND INSTRUCTION CODE GENERATION METHOD

(75) Inventors: Moriyasu Banno, Yokohama (JP);
Tomoaki Shoda, Yokohama (JP);
Hiroshi Itaya, Kawasaki (JP);
Tomotaka Saito, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 676 days.

(21) Appl. No.: 09/778,069

(22) Filed: Feb. 7, 2001

(65) Prior Publication Data

US 2001/0013093 A1 Aug. 9, 2001

(30) Foreign Application Priority Data

Feb. 8, 2000 (JP) ........................................ P2000-30948

(51) Int. Cl.[7] ............................ G06F 9/32; G06F 9/318
(52) U.S. Cl. ...................................... 712/210; 712/225
(58) Field of Search ................................ 712/209, 210, 712/208, 212, 213, 225; 345/501, 519

(56) References Cited

U.S. PATENT DOCUMENTS

| | | | | |
|---|---|---|---|---|
| 5,801,715 A | * | 9/1998 | Norman | 345/505 |
| 5,881,258 A | | 3/1999 | Arya | |
| 6,128,094 A | * | 10/2000 | Smith | 358/1.15 |
| 6,141,635 A | * | 10/2000 | Paul et al. | 703/22 |
| 6,151,618 A | * | 11/2000 | Wahbe et al. | 718/1 |
| 6,292,883 B1 | * | 9/2001 | Augusteijn et al. | 712/209 |
| 6,397,324 B1 | * | 5/2002 | Barry et al. | 712/225 |
| 6,515,759 B1 | * | 2/2003 | Smith | 358/1.15 |
| 6,529,635 B1 | * | 3/2003 | Corwin et al. | 382/243 |

FOREIGN PATENT DOCUMENTS

| | | |
|---|---|---|
| JP | 5-20086 | 1/1993 |
| JP | 06-348490 | 12/1994 |
| JP | 09-062504 | 3/1997 |
| JP | 9-231071 | 9/1997 |
| JP | 11-306015 | 11/1999 |
| JP | 2001-195250 | 7/2001 |
| WO | WO 97/27544 | 7/1997 |

OTHER PUBLICATIONS

Lefurgy et al. "Evaluation of a High Performance Code Compression Method", 1999 IEEE, Proceedings of Micro–32, Nov. 16–18, 1999.*

* cited by examiner

Primary Examiner—Henry W. H. Tsai
(74) Attorney, Agent, or Firm—Oblon, Spivak, McClelland, Maier & Neustadt, P.C.

(57) ABSTRACT

An instruction code conversion unit, an information processing system provided with the instruction code conversion unit and an instruction code generation method for generating instruction codes which are converted by the instruction code conversion unit are described. The efficiency of coding of the program is improved by making use of an existing processor as selected is used without modification. An instruction code conversion unit performs conversion of the address of a native instruction code to the address of the corresponding compressed instruction code in a program memory by shifting the address of the native instruction code as outputted from the processor to the right by one bit.

11 Claims, 23 Drawing Sheets

FIG.1
PRIOR ART
EXISTING INSTRUCTION
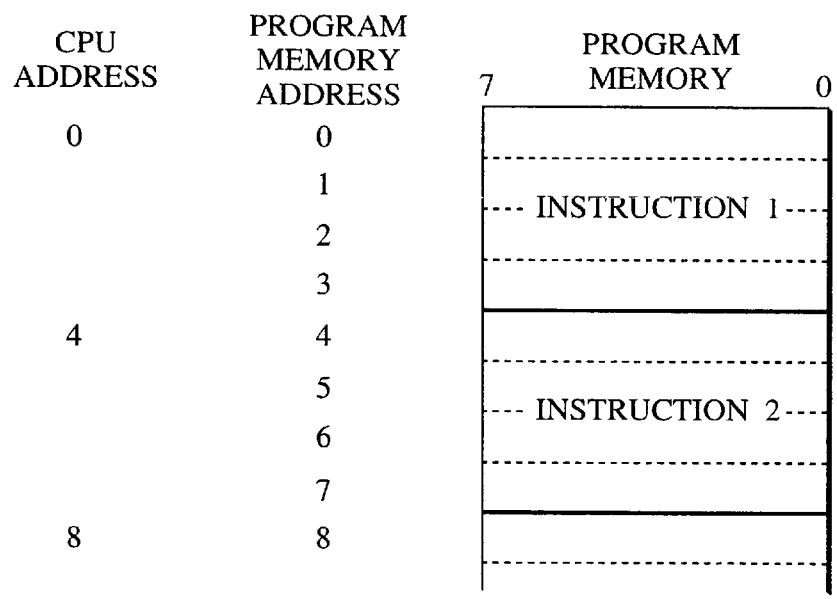
ADDITIONAL INSTRUCTION
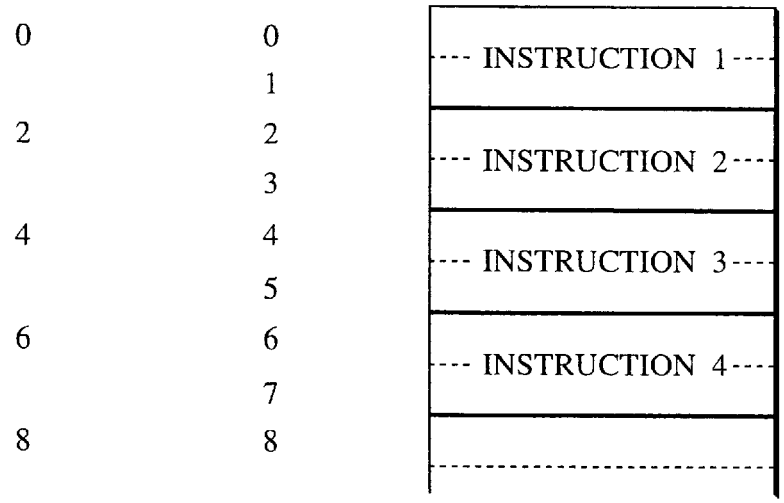

NATIVE INSTRUCTION CODES

COMPRESSED INSTRUCTION CODES

ADDRESS CONVERSION

1 BIT SHIFT TO RIGHT

INSTRUCTION FETCH TO EXECUTION

ENCODING ONE NATIVE INSTRUCTION TO ONE COMPRESSED INSTRUCTION

ENCODING TWO NATIVE INSTRUCTIONS TO ONE COMPRESSED INSTRUCTION

FIG.12

CORRESPONDENCE BETWEEN PROGRAM MEMORY AND BUFFER MEMORY

| CPU ADDRESS | PROGRAM MEMORY ADDRESS | PROGRAM MEMORY (15-0) | | BUFFER MEMORY ADDRESS | BUFFER MEMORY (31-0) | |
|---|---|---|---|---|---|---|
| 12340000 | 091A0000 | INST.A | ← BLOCK BOUNDARY | 00 | INST.A' | ⎫ |
| 12340004 | 091A0002 | B | | 02 | B1' | |
| 12340008 | 091A0004 | | | 04 | B2' | |
| 1234000C | 091A0006 | C | | 06 | C' | |
| 12340010 | 091A0008 | D | | 08 | D' | |
| 12340014 | 091A000A | E | | 0A | E' | |
| 12340018 | 091A000C | F | | 0C | F1' | |
| 1234001C | 091A000E | | | 0E | F2' | |
| 12340020 | 091A0010 | G | | 10 | G1' | |
| 12340024 | 091A0012 | | | 12 | G2' | |
| 12340028 | 091A0014 | H | | 14 | H' | |
| 1234002C | 091A0016 | I | | 16 | I' | |
| 12340030 | 091A0018 | J | | 18 | J' | |
| 12340034 | 091A001A | K | | 1A | K' | |
| 12340038 | 091A001C | L | | 1C | L' | BLOCK 0 |
| 1234003C | 091A001E | M | | 1E | M1' | |
| 12340040 | 091A0020 | | | 20 | M2' | |
| 12340044 | 091A0022 | N | | 22 | N' | |
| 12340048 | 091A0024 | O | | 24 | O1' | |
| 1234004C | 091A0026 | | | 26 | O2' | |
| 12340050 | 091A0028 | P | | 28 | P' | |
| 12340054 | 091A002A | Q | | 2A | Q' | |
| 12340058 | 091A002C | R | | 2C | R' | |
| 1234005C | 091A002E | S | | 2E | S1' | |
| 12340060 | 091A0030 | | | 30 | S2' | |
| 12340064 | 091A0032 | T | | 32 | T1' | |
| 12340068 | 091A0034 | | | 34 | T2' | |
| 1234006C | 091A0036 | U | | 36 | U' | |
| 12340070 | 091A0038 | V | | 38 | V1' | |
| 12340074 | 091A003A | | | 3A | V2' | |
| 12340078 | 091A003C | W | | 3C | W' | |
| 1234007C | 091A003E | X | ← BLOCK BOUNDARY | 3E | X' | ⎭ |
| 12340080 | 091A0040 | Y | | 00 | Y1' | ⎫ BLOCK 1 |
| 12340084 | 091A0042 | | | 02 | Y2' | |
| 12340088 | 091A0044 | Z | | 04 | Z' | |

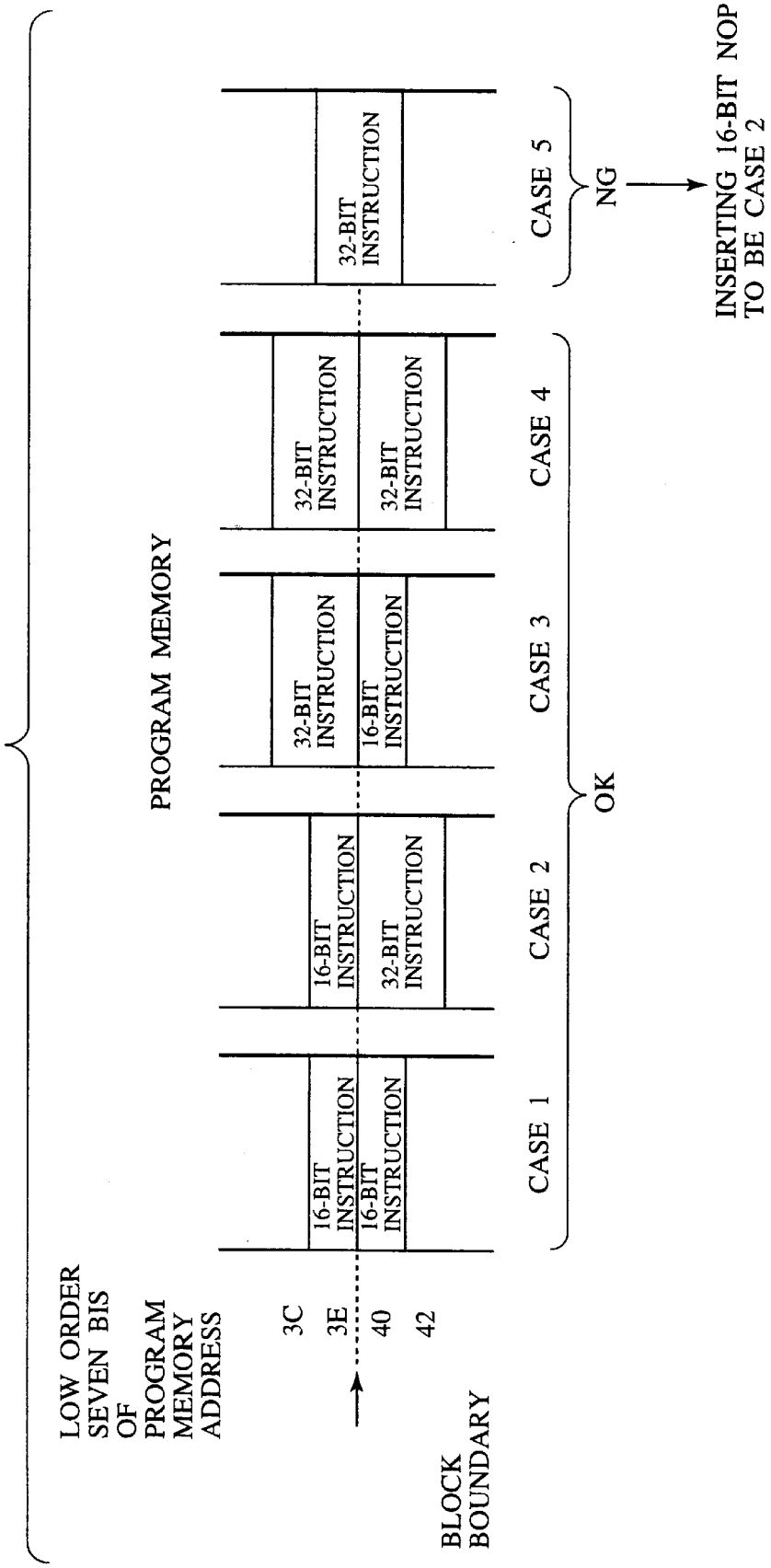

FIG.14

| BUFFER MEMORY ADDRESS | BLOCK 0 (31 - 0) | BLOCK 1 (31 - 0) |
|---|---|---|
| 0 | | |
| 2 | | |
| 4 | | |
| 6 | | |
| 8 | | |
| A | | |
| C | | |
| E | | |
| 10 | | |
| 12 | | |
| 14 | | |
| 16 | | |
| 18 | | |
| 1A | | |
| 1C | | |
| 1E | | |
| 20 | | |
| 22 | | |
| 24 | | |
| 26 | | |
| 28 | | |
| 2A | | |
| 2C | | |
| 2E | | |
| 30 | | |
| 32 | | |
| 34 | | |
| 36 | | |
| 38 | | |
| 3A | | |
| 3C | | |
| 3E | | |

BLOCK ADDRESS STORING TEGISTER (31 - 6)

EFFECTIVE ADDRESS STORING TEGISTER (6 - 1)

BUFFER MEMORY DESIGNATION REGISTER (0)

FIG.15
ADDRESS SPACE
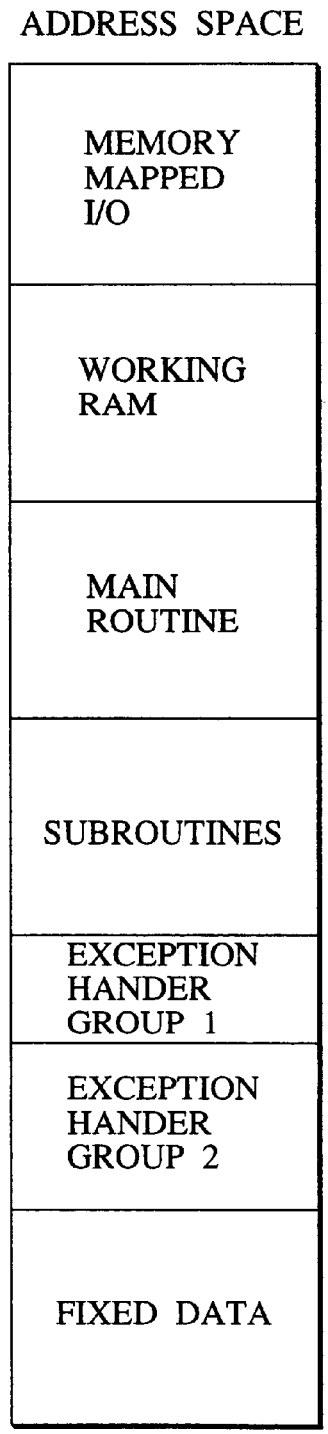
MAIN ROUTINE
BUFFER BLOCKS
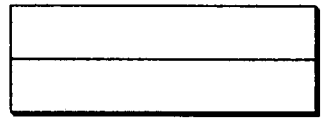
SUBROUTINE
BUFFER BLOCKS
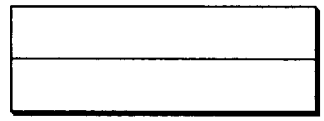
EXCEPTION HANDER
BUFFER MEMORY BLOCK
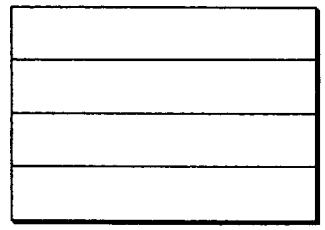
} FOR GROUP 1
} FOR GROUP 2

FIG. 16

| CODE LENGTHS OF THE COMPRESSED INSTRUCTIONS | MEANS FOR DETECTING THE LENGTH OF COMPRESSED INSTRUCTIONS | NUMBER OF THE NATIVE INSTRUCTIONS PER COMPRESSED INSTRUCTION | INTERMIXING OF COMPRESSED INSTRUCTIONS AND NATIVE INSTRUCTIONS | MEANS FOR DETECTING COMPRESSION | DISTINGUISHING BETWEEN DATA AND INSTRUCTION CODES | EXPANSION PROCESS WHEN TRANSFERRING THE CONTROL | ADDITIONAL INFORMATION TO THE BUFFER MEMORY | EXPANDING CODES AHEAD WHEN ENTERING PARTIALLY VALID BLOCK |
|---|---|---|---|---|---|---|---|---|
| FIXED | — | SINGLE | NOT SUPPORTED | — | CONTROL SIGNAL | | | |
| FIXED | — | SINGLE | NOT SUPPORTED | — | READ REQUEST SIGNAL | | | |
| FIXED | — | SINGLE | NOT SUPPORTED | — | ADDRESS RANGE | | | |
| FIXED | — | SINGLE | NOT SUPPORTED | — | SEPARATED ADDRESS SPACE | | | |
| FIXED | — | SINGLE | NOT SUPPORTED | — | ANY ONE OF ABOVE MEANS | | | |
| FIXED | — | SINGLE | SUPPORTED | ADDRESS | ANY ONE OF ABOVE MEANS | HALTED | ONE BIT PER ADDRESS | NO |
| FIXED | — | SINGLE | SUPPORTED | CODE | ANY ONE OF ABOVE MEANS | HALTED | ONE BIT PER ADDRESS | NO |
| FIXED | — | SINGLE | SUPPORTED | REGISTER | ANY ONE OF ABOVE MEANS | HALTED | ONE BIT PER ADDRESS | NO |
| FIXED | — | SINGLE | SUPPORTED | EXTERNAL SIGNAL | ANY ONE OF ABOVE MEANS | HALTED | ONE BIT PER ADDRESS | NO |
| FIXED | — | PLURAL | SUPPORTED OR NOT SUPPORTED | ANY ONE OF ABOVE MEANS | ANY ONE OF ABOVE MEANS | | | |
| VARIABLE | LOCATED IN A REDETERMINED WORD | SINGLE | NOT SUPPORTED | — | ANY ONE OF ABOVE MEANS | HALTED | ONE EFFECTIVE ADDRESS STORING REGISTER PER BLOCK | YES |
| VARIABLE | LOCATED IN A REDETERMINED WORD | SINGLE | NOT SUPPORTED | — | ANY ONE OF ABOVE MEANS | HALTED | ONE EFFECTIVE ADDRESS STORING REGISTER PER BLOCK | NO |
| VARIABLE | LOCATED IN A REDETERMINED WORD | SINGLE | SUPPORTED | ANY ONE OF ABOVE MEANS | ANY ONE OF ABOVE MEANS | CONTINUE | ONE VALID BIT PER ADDRESS | YES OR NO |
| VARIABLE | LOCATED IN A REDETERMINED WORD | SINGLE | SUPPORTED OR NOT SUPPORTED | ANY ONE OF ABOVE MEANS | ANY ONE OF ABOVE MEANS | ANY ONE OF ABOVE MEANS | ANY ONE OF ABOVE MEANS | YES OR NO |
| VARIABLE | LOCATED IN A REDETERMINED WORD | PLURAL | SUPPORTED OR NOT SUPPORTED | ANY ONE OF ABOVE MEANS | ANY ONE OF ABOVE MEANS | ANY ONE OF ABOVE MEANS | ANY ONE OF ABOVE MEANS | YES OR NO |
| VARIABLE | LOCATED IN ANY WORD | SINGLE OR PLURAL | SUPPORTED OR NOT SUPPORTED | ANY ONE OF ABOVE MEANS | ANY ONE OF ABOVE MEANS | HALTED | ONE VALID BIT PER ADDRESS | NO |
| KEY POINTS 1 | | 2 | 3 | KEY POINTS | 4 | 5 | 6 | 7 |

FIG.21

| COMPRESSED/NATIVE INSTRUCTION DISCRIMINATION SIGNAL S5 | MEMORY READ REQUEST SIGNAL S12 | INSTRUCTION CODE OC11 OUTPUT FROM SELECTOR CIRCUIT 11 |
|---|---|---|
| NATIVE INSTRUCTION CODE ADDRESS RANGE | ENABLED | don't care |
| | DISABLED | INSTRUCTION CODE OC7 (B1,B2,B3···) |
| COMPRESSED INSTRUCTION CODE ADDRESS RANGE | ENABLED | INSTRUCTION CODE OC8 (C1,C2,C3···) |
| | DISABLED | INSTRUCTION CODE OC7 (C1,C2,C3···) |

INSTRUCTION CODE CONVERSION UNIT AND INFORMATION PROCESSING SYSTEM AND INSTRUCTION CODE GENERATION METHOD

CROSS REFERENCE TO RELATED APPLICATIONS

The subject application is related to subject matter disclosed in the Japanese Patent Application No.Hei12-30948 filed in Feb. 8, 2000 in Japan, to which the subject application claims priority under the Paris Convention and which is incorporated by reference herein.

BACKGROUND OF THE INVENTION

1. Field of the Invention

The present invention is related to an instruction code conversion unit, an information processing system provided with the instruction code conversion unit and an instruction code generation method for generating instruction codes which are converted by the instruction code conversion unit.

2. Prior Art

In the case where a microprocessor is implemented with fixed-length instruction codes (32-bit length in many cases) as RISC processors, the efficiency of coding tends to be low to increase the memory space for storing instruction codes as compared with a microprocessor implemented with variable-length instruction codes (8-bit to 32-bit length in many cases) such as CISC processors. The efficiency of coding used in this description is the ratio of the size of source codes to the size of the corresponding object codes as compiled.

It is difficult to employ such a processor requiring a higher capacity semiconductor memory chip or a number of memory chips for use in personal appliances. Although depending upon the architecture of the RISC processor, there are two main factors of lowering the efficiency of coding as follows.

(a) The length of the instruction codes is long such as the 32-bit fixed length.
(b) There are provided a small number of instructions.

In order to improve the efficiency of coding, with respect to the factor (a), there have been developed RISC processors implemented with fixed-length instruction codes of 16-bit lengths and RISC processors implemented with variable-length instruction codes of 16-bit/32-bit lengths. With respect to the factor (b), there have been developed RISC processors implemented with a variety of instructions comparable to a CISC processor. In the case of the processor with fixed-length instruction codes of 16-bit lengths, the factor (b) is not solved because the number of the available instructions is limited by the shorter bit length of the codes and because the immediate operands as treated are constrained (for example 16-bit data can not directly be manipulated), and therefore the efficiency of coding is not effectively improved. Also, since the number of instructions as required for the same program increases, the performance respective to the operation frequency tends to decrease as compared with a processor implemented with fixed-length 32-bit instruction codes.

RISC processors implemented with variable-length instruction codes of 16-bit/32-bit lengths have been developed to deal with these shortcomings. In this case, high speed operations are implemented with 32-bit instruction codes while the efficiency of coding is improved by providing a mixed sequence of 16-bit instruction codes and 32-bit instruction codes.

The additional instructions to be added to the instruction set of the existing processor include an instruction for switching the instruction mode (the mode in which are executed the original 32-bit instruction codes and the mode in which are executed the additional 16-bit instruction codes or a mixed sequence of 16-bit instruction codes and 32-bit instruction codes), and new instructions which are not corresponding to any 32-bit original instruction codes. For this reason, it is necessary to modify the hardware of the existing processor. For example, the existing processor has to be modified to provide an instruction code expanding circuit for expanding the additional instructions as compressed and an instruction decoding circuit for decoding the new instructions as introduced. Furthermore, it is necessary to modify some circuits inside of the processor such as the pipelined control circuit. The least significant bits of the program counter are used as a register to indicate the current instruction mode. The instruction code expanding circuit and the instruction decoding circuit are controlled with the register.

In the case of the RISC processors implemented with CISC-like complicated instructions, the instruction execution circuit becomes complicated so that it is difficult to enable high speed operations by increasing the operation frequency, which is the general feature of RISC processors. Accordingly, this kind of the processor has been designed to operate only at a relatively low speed (lower than 100 MHz).

On the other hand, several techniques have been proposed in order to improve the efficiency of coding as follows.

A first example is the techniques of generating an instruction code sequence which has a fewer number of steps or shorter code lengths by modifying the compiler or the assembler for generating program codes. Generally, the source text of a target program is described in a high level language such as C-language and so forth. The compiler is used to convert the source text of a target program to an assembly source code program. The assembly source code program is converted into an object program consisting of instruction codes which are directly decoded by a processor. The number of steps is the number of instruction codes. The compiler or the assembler is modified in order that the source text of the target program is converted into a fewer number of instruction codes. On the other hand, in some processor, there are a plurality of the instruction codes having the same function. The assembler is modified in order that the source text of the target program is converted into instruction codes which have shorter code lengths. This function of the assembler is called optimization which can be refined to make shorter the instruction codes.

A second example is the techniques of generating an instruction code sequence which has a fewer number of steps or shorter code lengths by adding new instructions to the processor. There are two cases in accordance with this technique. One is such that a single new instruction is introduced to indicate an operation which is accomplished by a plurality of existing instructions. The other is such that a new instruction is introduced to indicate an original instruction with a shorter code.

A third example is a modification of the second example. In accordance with the third example, additional instructions having shorter code lengths are introduced in order that each additional instruction is expanded to an original instruction respectively.

A fourth example is the techniques of generating an instruction code sequence which has a fewer number of steps or shorter code lengths by replacing original instructions of the processor by new instructions.

A fifth example is the techniques of compressing the entirety or part of a program composed of native instructions of the processor by a software and, when executed, the program as compressed is expanded by a software or a hardware. In accordance with the fifth example, it is possible to reduce the program memory as required in advance of execution on the basis of the ZIP algorithm, the LZH algorithm and so forth in the same manner as a file is compressed and expanded.

A sixth example is a modification of the fifth example. In accordance with the sixth example, a program composed of native instructions of the processor is divided into a plurality of blocks. Compression and expansion is performed for each block. The program as compressed is executed while expanding each block by a software or a hardware.

The technique in accordance with the first example has shortcomings that the limitation of the original instruction codes of the processor can not be overcome so that the efficiency of coding is improved only to the extent that the native instruction codes of the processor are effectively utilized. When further improvement becomes necessary, any of the second to sixth examples has to be employed. The technique in accordance with any of the second to fourth examples means that a new processor has to be developed and therefore it takes much development time and resources to develop a software development environment, i.e., language tools such as a compiler and an assembler, test tools such as an ICE/Debugger, an OS, Co-simulation tools and so forth. Particularly, in the case of a general purpose computer, different users have different software development environments in general so that a plurality of software development supporting tool sets have to be prepared incurring substantial additional costs.

The technique in accordance with the third example also requires modification the existing processor in order that, while the additional instructions have shorter code lengths, the addresses given to the program memory for fetching the additional instructions are coincident to the corresponding addresses of the processor. For example, in the case where the original instructions are composed of 32-bit fixed-length instruction codes while the additional instructions are composed of 16-bit fixed-length instruction codes as illustrated in FIG. 1, each 32-bit original instruction occupies 4 bytes of the memory space while each 16-bit original instruction occupies 2 bytes of the memory space. The addresses for fetching the additional instructions have to be multiples of 2. Because of this, the processor is modified in order to increment by two the instruction address as treated in the processor. Furthermore, there has to be implemented an additional instruction for selecting either the additional instruction set or the original instruction set. In accordance with the third example, it also takes much development time and resources to develop a software development environment and tools. Even though the third example tends to lessen the burden as compared with the second example, the development is not so easy.

In accordance with the fifth example, it is possible to achieve a high compression rate since compression can be performed inclusive of data (the actual compression rate is depending upon the program). However, it takes a substantial time to expand compressed instructions and data, which require an extra memory space for loading the expanded instructions and data in addition to the compressed instructions and data. The application thereof is limited to some appropriate fields. Particularly, in the case where the compressed instructions are expanded by a software, the program can not be executed until expansion which takes much time. Even if the compressed instructions are expanded by hardware control, the memory has to be accessed to the compressed instructions and therefore the performance penalty is substantial.

In accordance with the sixth example, since the program composed of native instructions is divided into a plurality of blocks. Compression and expansion is performed for each block. The expansion of the compressed instructions takes a processing time which is depending on the size of the respective blocks but substantially improved as compared with the fifth example. Also, after the compression, the respective blocks of the program have different sizes so that it is necessary to save the correspondence information of the processor addresses and the memory addresses for expanding the compressed instructions. Namely, the compressed instructions are expanded by preparing in the program memory in advance an index table for obtaining the addresses of the compressed instructions from the processor address, reading the index table from the program memory, obtaining the addresses of the compressed instructions from the index table, reading a decoding lookup table which provides information about the compression and has been prepared in a memory region other than the program memory in advance, and expanding the compressed instructions with reference to the decoding lookup table. The expansion process therefore requires much time while the provision of the decoding lookup table tends to increase the chip cost.

Meanwhile, in a conventional information processing system, the improvement of performance is possible by the use of a wider bus for communication between the processor and the program memory in order to increase the number of instructions fetched per bus cycle. However, if a wider bus is used, a larger number of pins have to be provided for packages of the processor and the program memory which may possibly be composed of a plurality of memory chips while the area required of the circuit board is increased as the bus width is increased. On the other hand, if the bus width is simply reduced, one instruction can not be fetched in one bus cycle resulting in the performance penalty. If the 16-bit instruction codes are employed, a 16-bit bus is used to make it possible to fetch each instruction in each bus cycle and decrease the costs and the size without compromising the performance.

As explained above, in the case of some of the above described conventional techniques, 16-bit fixed instruction codes or the 16-bit/32-bit variable instruction codes are introduced by developing a processor anew or by substantially modifying the existing target processor. For this reason, much time and labours are inevitable for modifying the processor and development of software development tools. Furthermore, in accordance with some of the above described conventional techniques, the compressed instruction are used for improving the efficiency of coding without modifying the processor. However, expansion of the compressed instructions takes much time and necessitates the increase in the size and the costs of the system.

SUMMARY OF THE INVENTION

The present invention has been made in order to solve the shortcomings as described heretofore. It is an object of the present invention to provide an instruction code conversion unit, an information processing system provided with the instruction code conversion unit and an instruction code generation method for generating instruction codes which are converted by the instruction code conversion unit, in order to improve the efficiency of coding of the program and reduce the program memory as required for storing the program by making use of an existing processor as selected without modification.

In brief, the above and other objects and advantages of the present invention are provided by a new and improved information processing system comprising: a processor capable of executing native instruction codes; a program memory for storing a program at least part of which comprises compressed instruction codes; an instruction code conversion unit connected to said processor and said program memory for receiving an address of a native instruction code as outputted from said processor, converting the address of said native instruction code to the address of a corresponding native instruction code in said program memory, reading out said compressed instruction codes from the address of said compressed instruction code as converted, converting said compressed instruction code to said native instruction code as converted, and transferring said native instruction to said processor, wherein said instruction code conversion unit performs conversion of the address of said native instruction code to the address of the corresponding compressed instruction code in said program memory by shifting the address of said native instruction code as outputted from said processor to the right by one bit.

In a preferred embodiment, further improvement resides in that said instruction code conversion unit accesses to said program memory through a memory interface.

In a preferred embodiment, further improvement resides in that said compressed instruction codes are m-bit fixed-length codes or m-bit/n-bit (n≧m) variable-length codes while said native instruction codes are n-bit fixed-length codes.

In a preferred embodiment, further improvement resides in that said program memory includes a compressed instruction code address range for storing said compressed instruction codes and a native instruction code address range for storing said native instruction codes while the addresses of the native instruction codes as outputted from said processor are used as means for distinguishing between said compressed instruction codes and said native instruction codes.

In a preferred embodiments further improvement resides in that said compressed instruction codes are variable-length codes; and wherein said program as stored in said program memory is divided into a plurality of memory blocks of said compressed instruction codes in order that the leading bits of each memory block are occupied by high order bits of a compressed instruction code.

In a preferred embodiment, further improvement resides in that said instruction code conversion unit is provided with a buffer memory for storing the native instruction codes as converted by said instruction code conversion unit.

In a preferred embodiment, further improvement resides in that said buffer memory is composed of a plurality of buffer memory blocks each of which accommodates native instruction codes corresponding to said compressed instruction codes with which one memory blocks is filled; and wherein each buffer memory block is provided with a block address storing register for storing information indicative of the addresses of the native instruction codes stored therein.

In a preferred embodiment, further improvement resides in that said information processing system is provided with a comparator circuit for comparing the addresses of the native instruction codes as stored in said buffer memory blocks with the address of the native instruction code as outputted from said processor.

In a preferred embodiment, further improvement resides in that said information processing system is provided with a register indicative of whether or not the information stored in said block address storing register is valid.

In accordance with another aspect of the present invention, the above and other objects and advantages of the present invention are provided by a new and improved instruction code conversion unit connected to a processor capable of executing native instruction codes and a program memory for storing a program at least part of which comprises compressed instruction codes, receiving an address of a native instruction code as outputted from said processor, converting the address of said native instruction code to the address of a corresponding native instruction code in said program memory, reading out said compressed instruction codes from the address of said compressed instruction code as converted, converting said compressed instruction code to said native instruction code as converted, and transferring said native instruction to said processor, wherein said instruction code conversion unit performs conversion of the address of said native instruction code to the address of the corresponding compressed instruction code in said program memory by shifting the address of said native instruction code as outputted from said processor to the right by one bit.

In accordance with a further aspect of the present invention, the above and other objects and advantages of the present invention are provided by a new and improved instruction code generation method for the information processing system, said method comprising: a step of assembling a source program with said subset of said native instruction codes in order to generate an assembler source program; a step of converting said assembler source program to a relocatable object; a step of converting said relocatable object to an absolute object file consisting of said native instruction codes; a step of converting said absolute object file consisting of said native instruction codes to an absolute object file consisting of said compressed instruction codes by shifting addresses of said native instruction codes written in said absolute object file consisting of said native instruction codes by one bit to the right and converting said native instruction codes to said compressed instruction codes; and a step of converting said absolute object file consisting of said compressed instruction codes to an object program loadable to said program memory.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 1 is a schematic diagram showing a technique of improving the efficiency of coding in accordance with a conventional technique.

Figure 7:
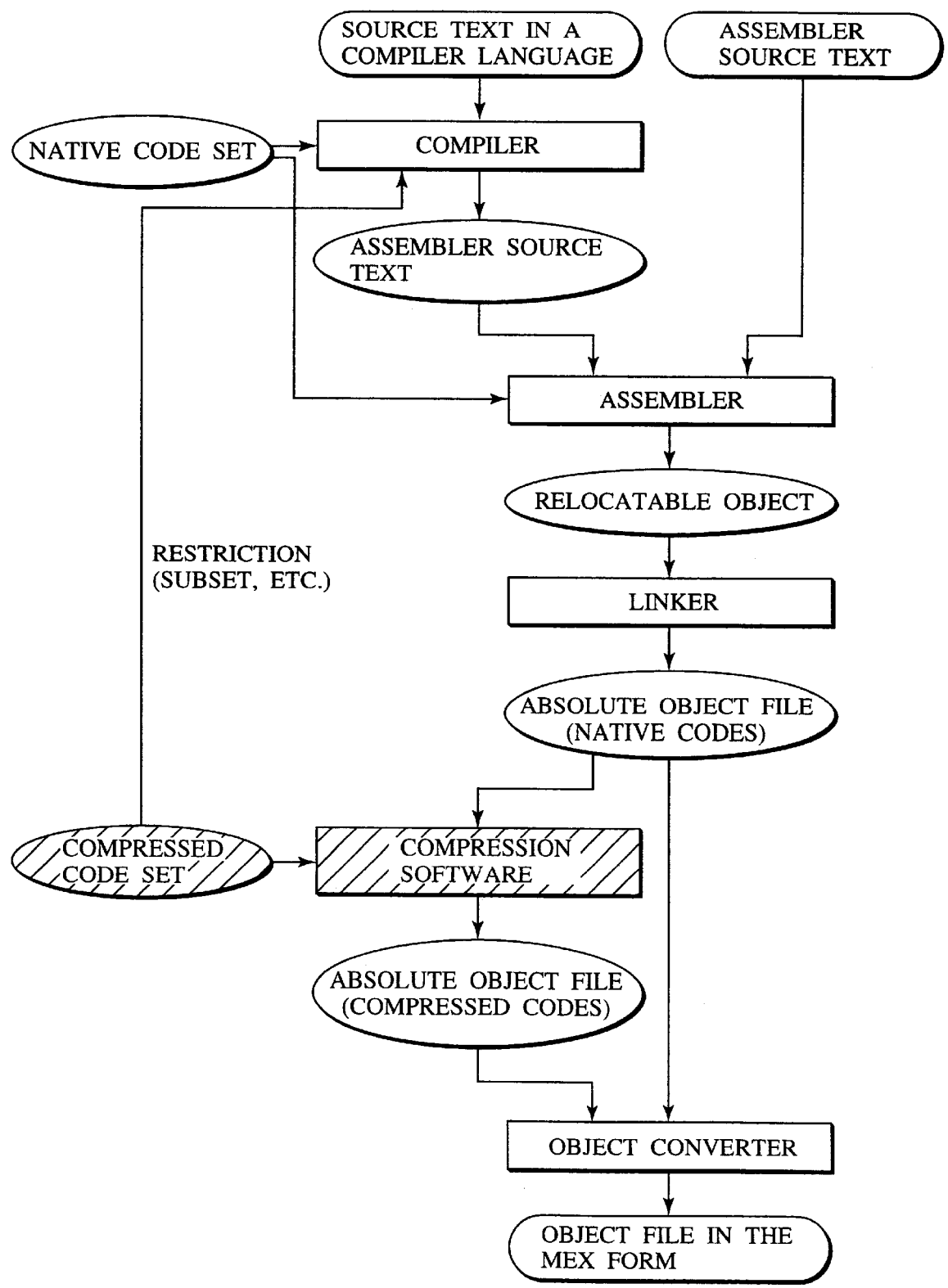

The compression will be explained as follows with reference to FIG. 7 is a flow chart showing the procedure of compression of native instruction codes.

FIG. 8 is a schematic diagram showing encoding methods for determining the bit length of an instruction.

Figure 9:
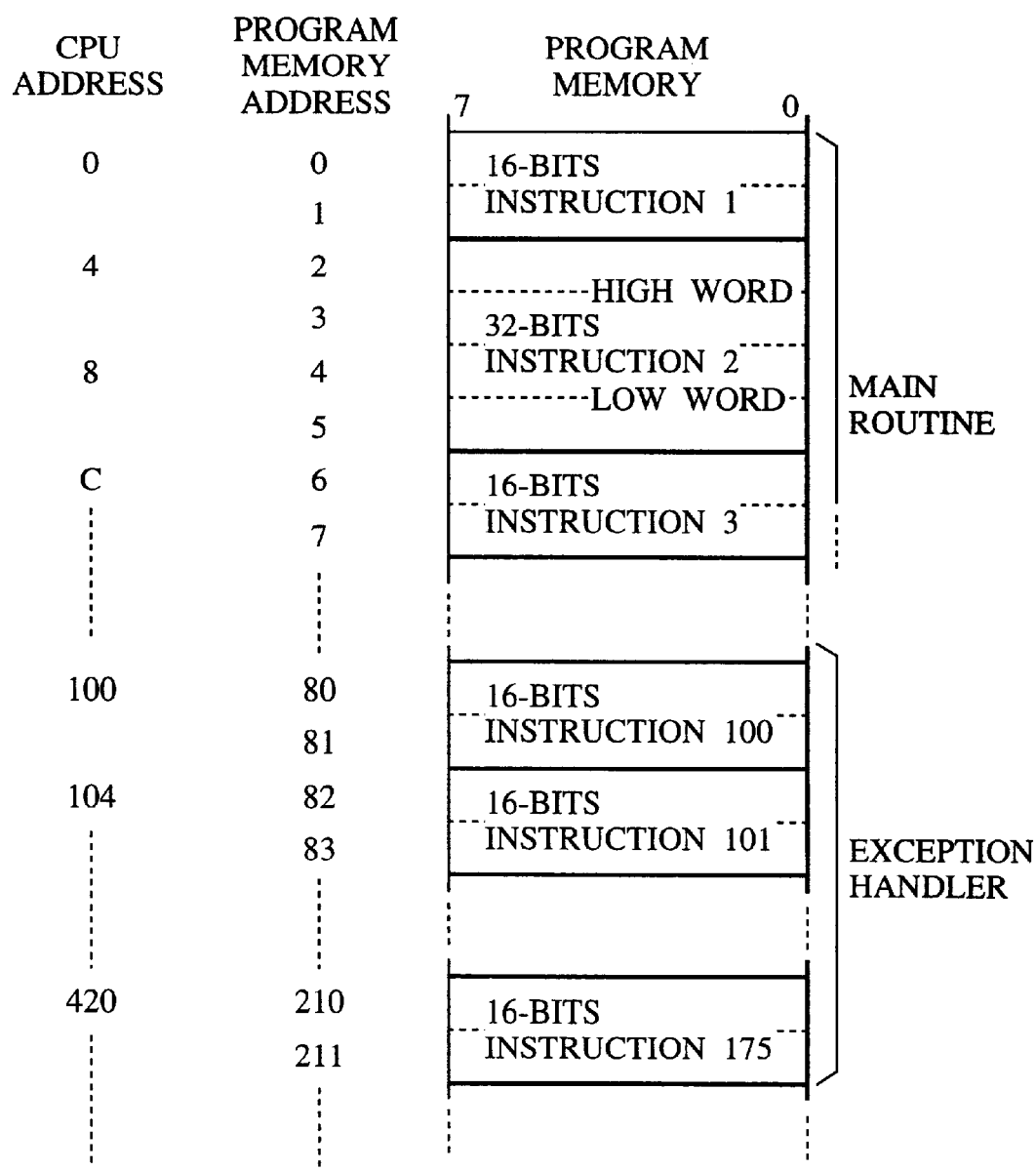

FIG. 9 is a schematic diagram showing 16-bit/32-bit compressed instruction codes are stored in a program memory.

Figure 10A:
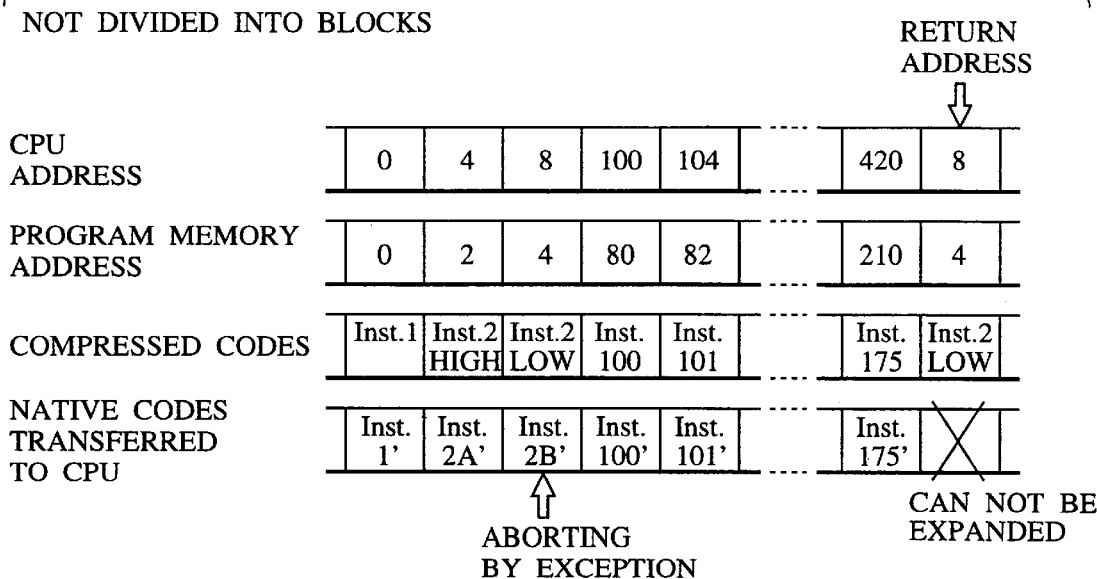
Figure 10B:
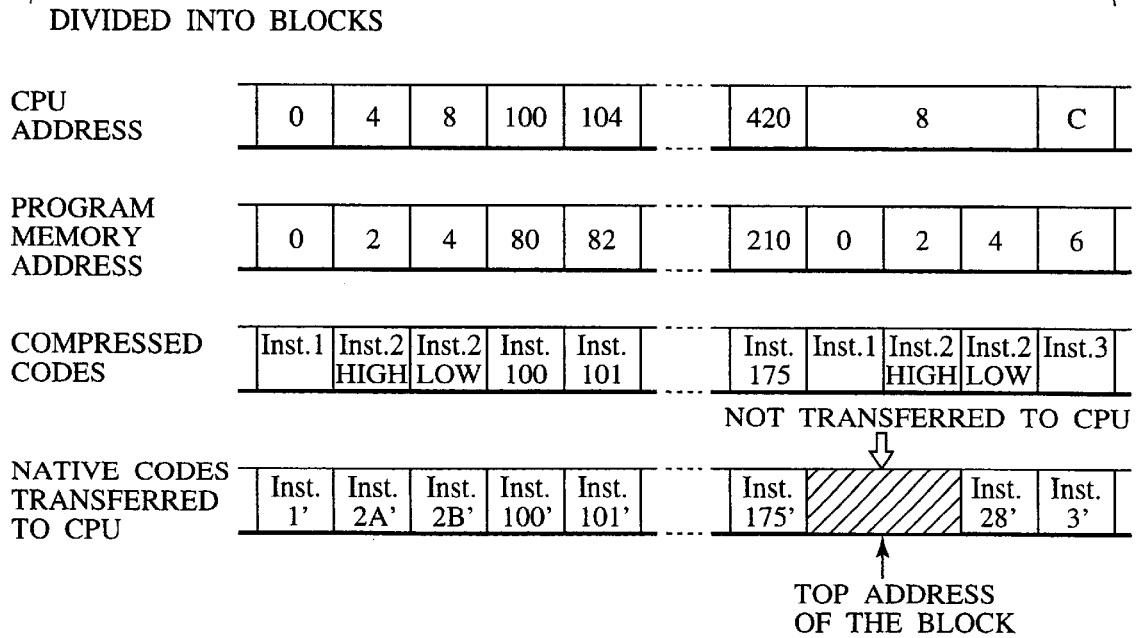

FIG. 10 is an explanatory view for explaining the expansion of compressed instruction codes when an exception occurs with and without provision of blocks.

Figure 11:
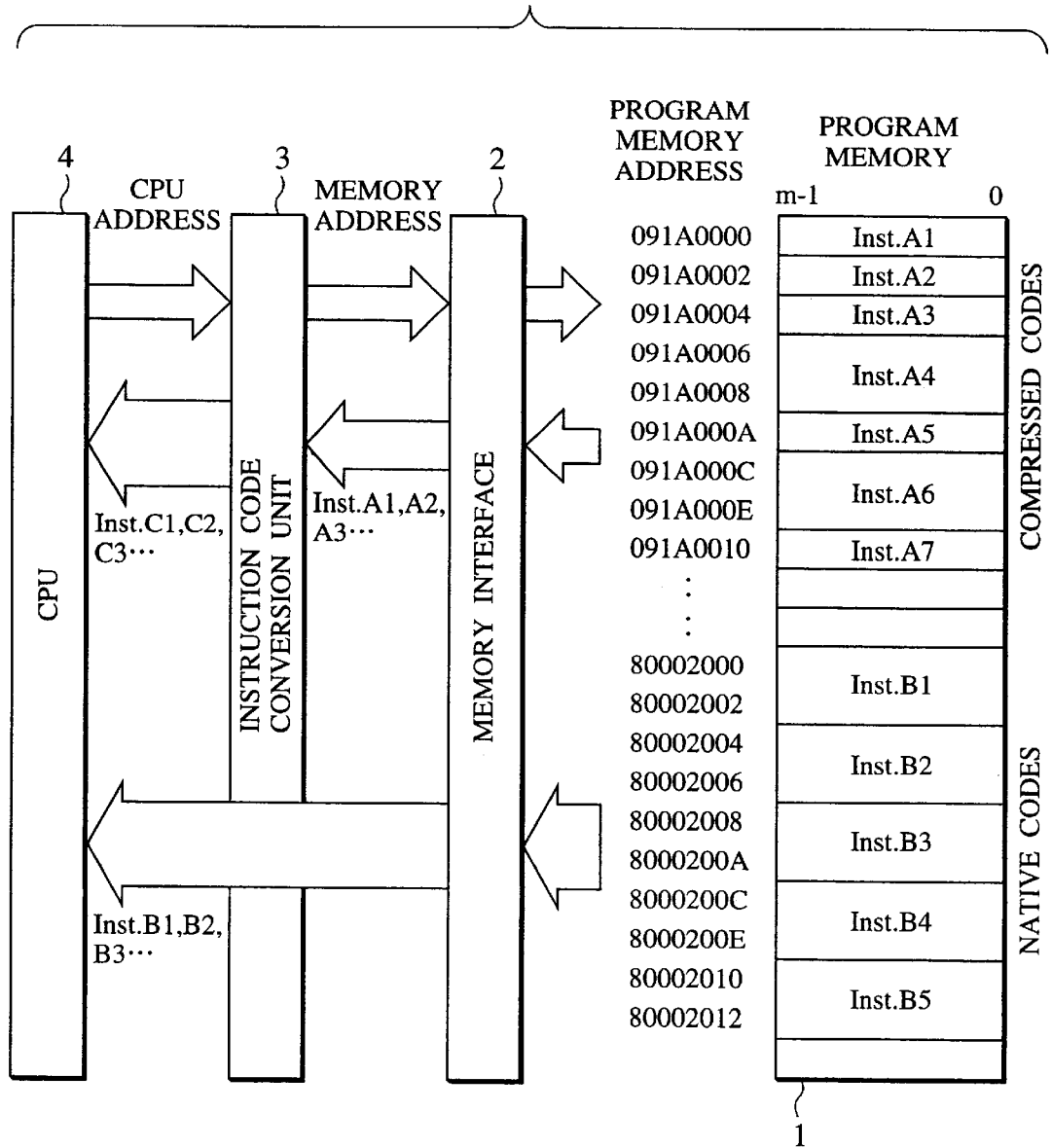

FIG. 11 is a schematic diagram showing the conversion of the compressed instruction codes and the address thereof in accordance with the present invention.

FIG. 12 is a schematic diagram showing the relationship between the address of the program memory and the address of the buffer memory.

FIG. 13 is a schematic diagram for explaining the restriction that no 32-bit compressed instruction code can not be located bridging adjacent blocks.

FIG. 14 is a schematic diagram showing a buffer memory and several registers containing additional information.

FIG. 15 is a schematic diagram showing the configuration of the address space of the processor and the configuration of the buffer memory.

FIG. 16 is a table showing seven key points in accordance with the present invention.

Figure 17A:
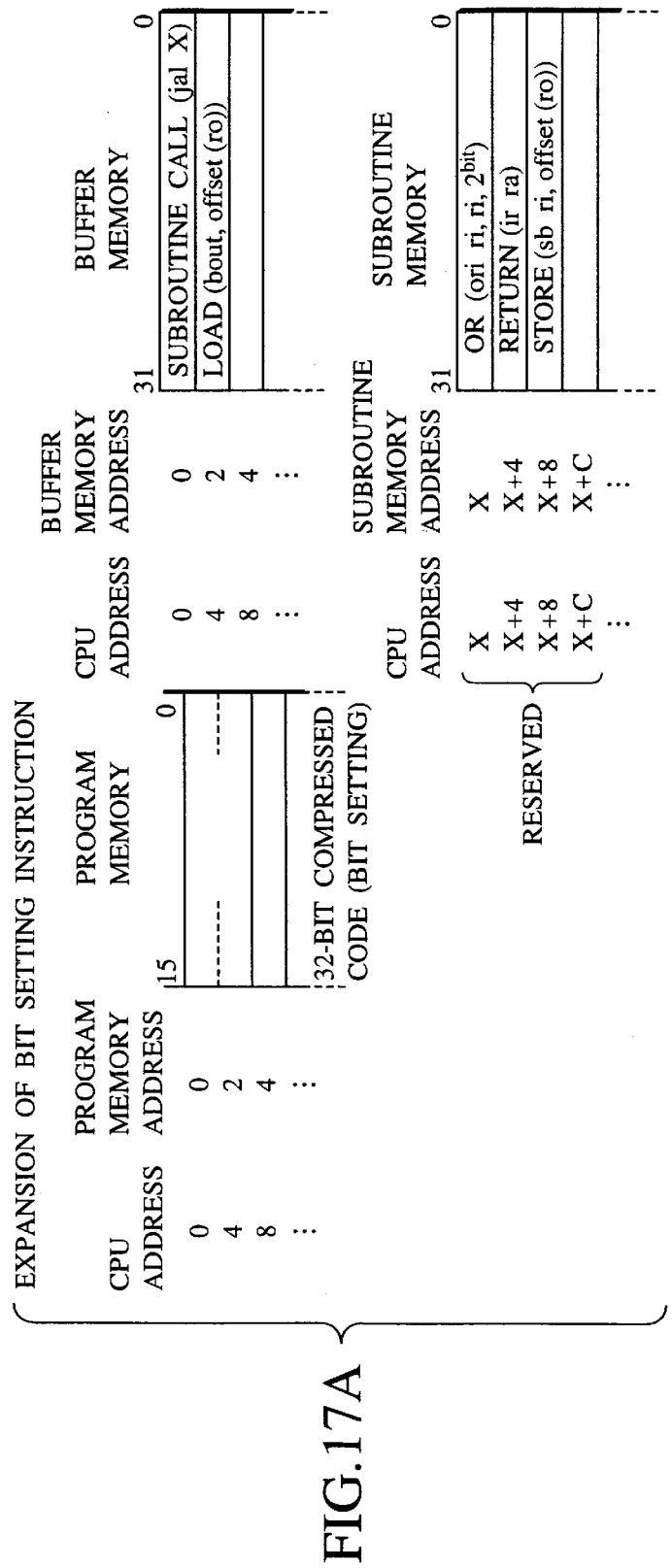
Figure 17B:
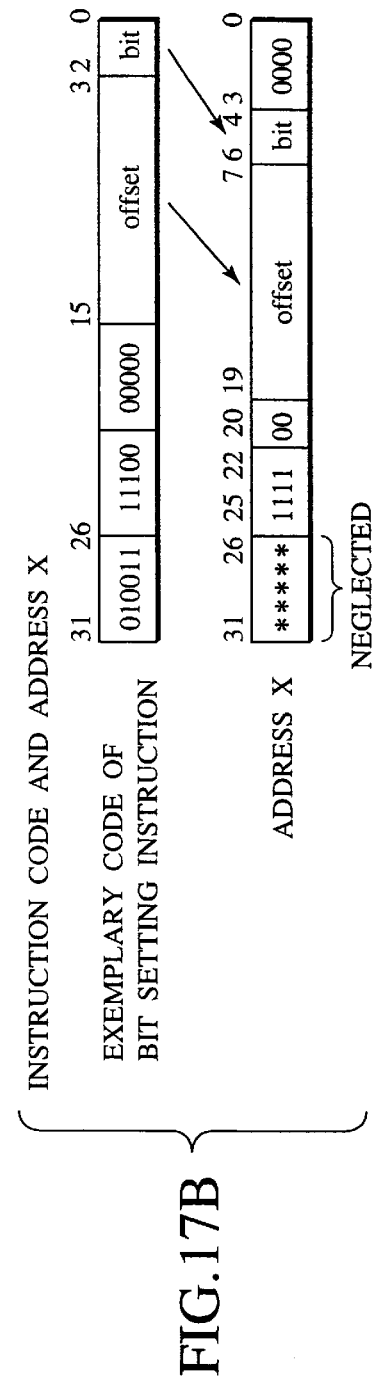

FIG. 17 is a schematic diagram showing an exemplary compressed instruction code expanded to a subroutine memory.

Figure 18:
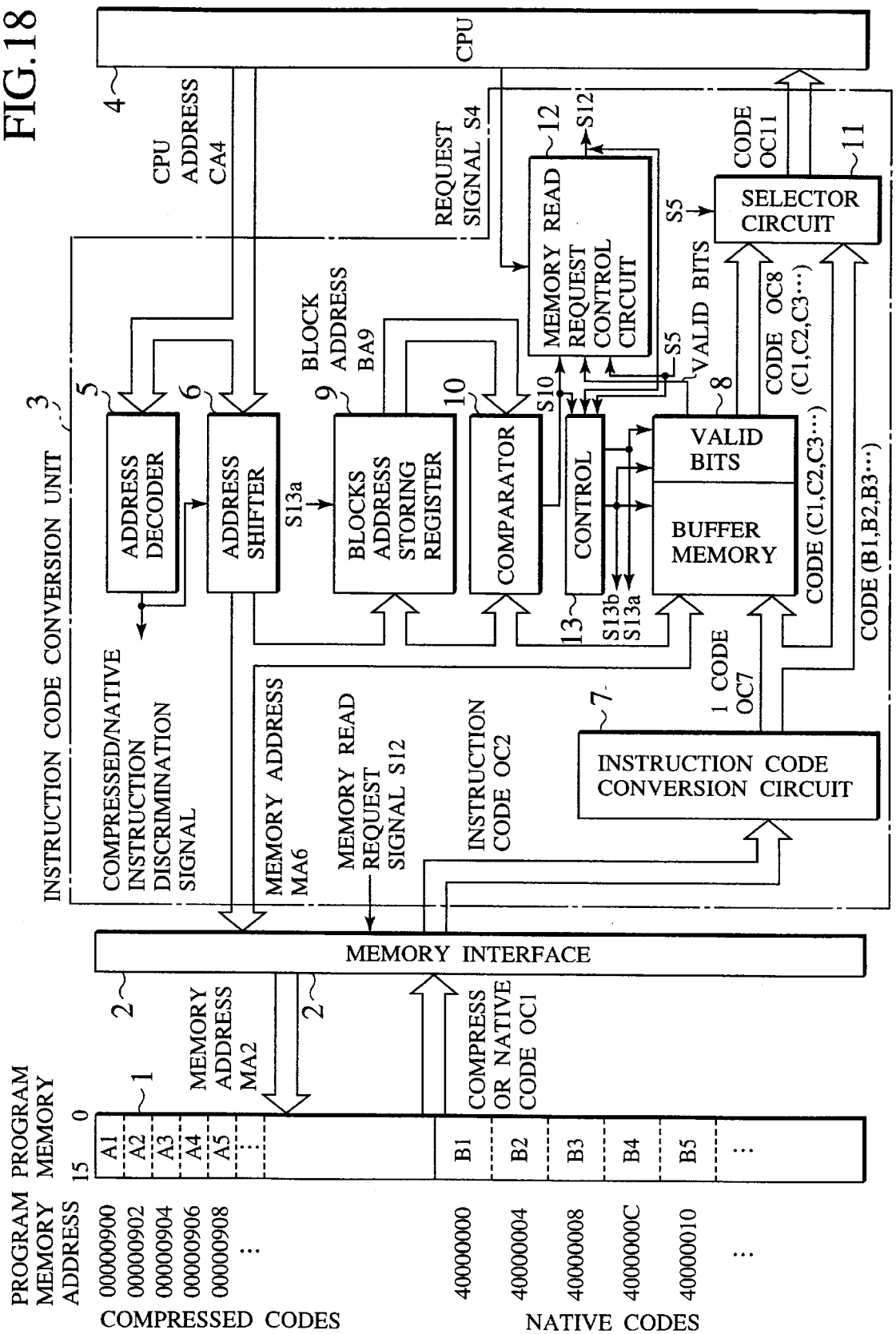

FIG. 18 is a block diagram showing the entire configuration of an exemplary information processing system in accordance with the present invention.

Figure 19:
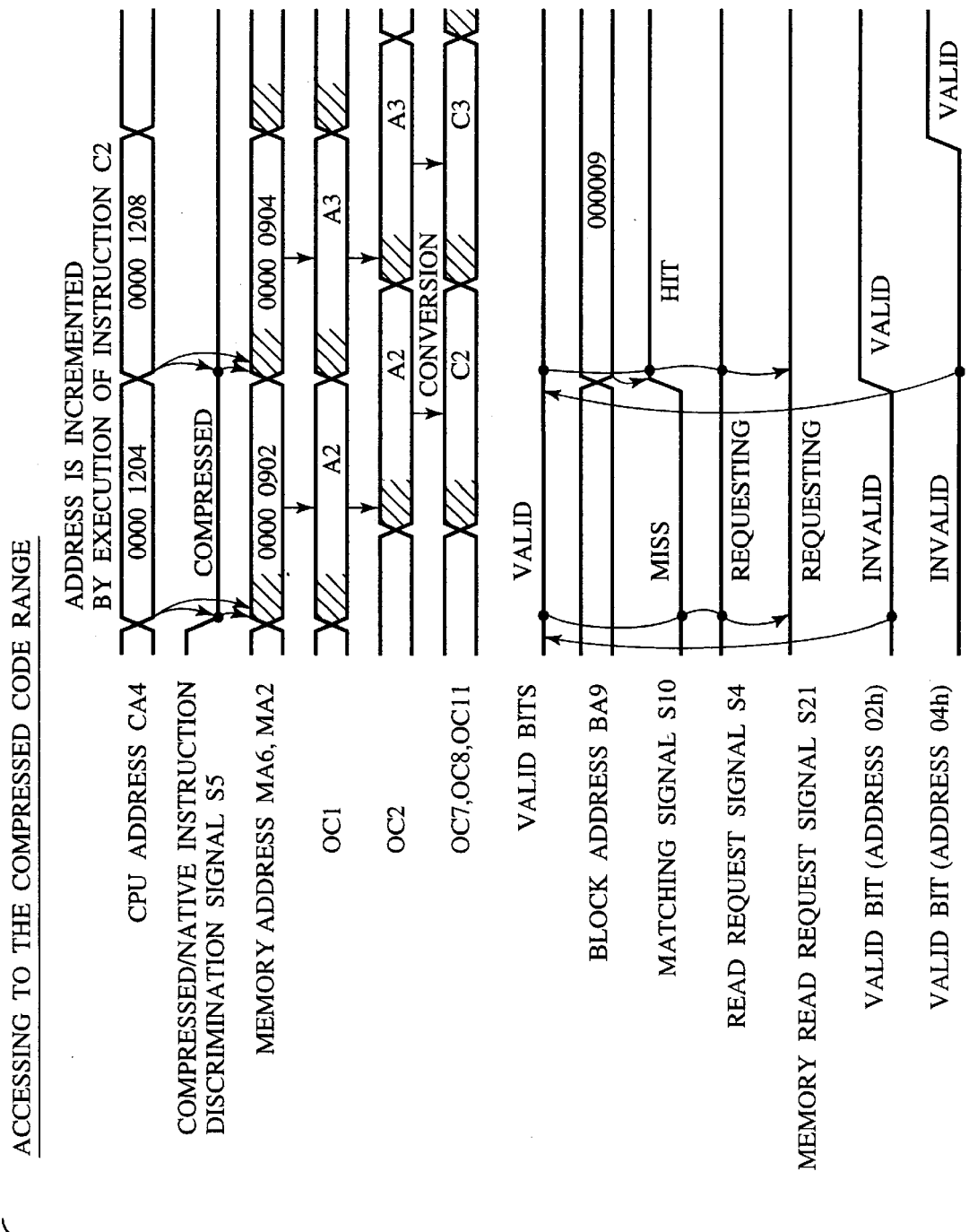

FIG. 19 is a timing chart of accessing to the compressed instruction code address range in the case of the information processing system as illustrated in FIG. 18.

Figure 20:
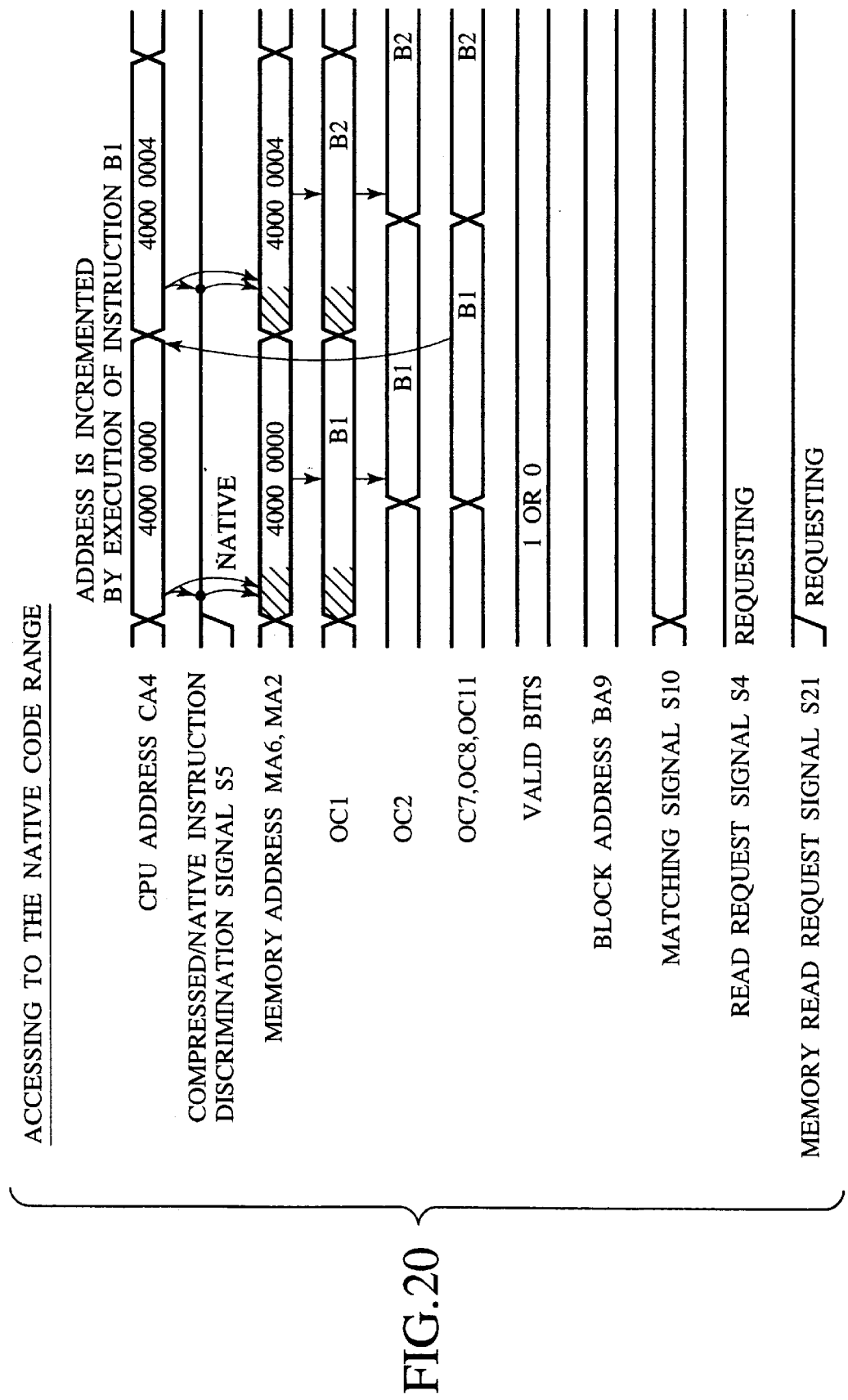

FIG. 20 is a timing chart of accessing to the native instruction code address range in the case of the information processing system as illustrated in FIG. 18.

FIG. 21 is a table showing the operation of the selector circuit 11 composed of a multiplexer as illustrated in FIG. 18.

Figure 22:
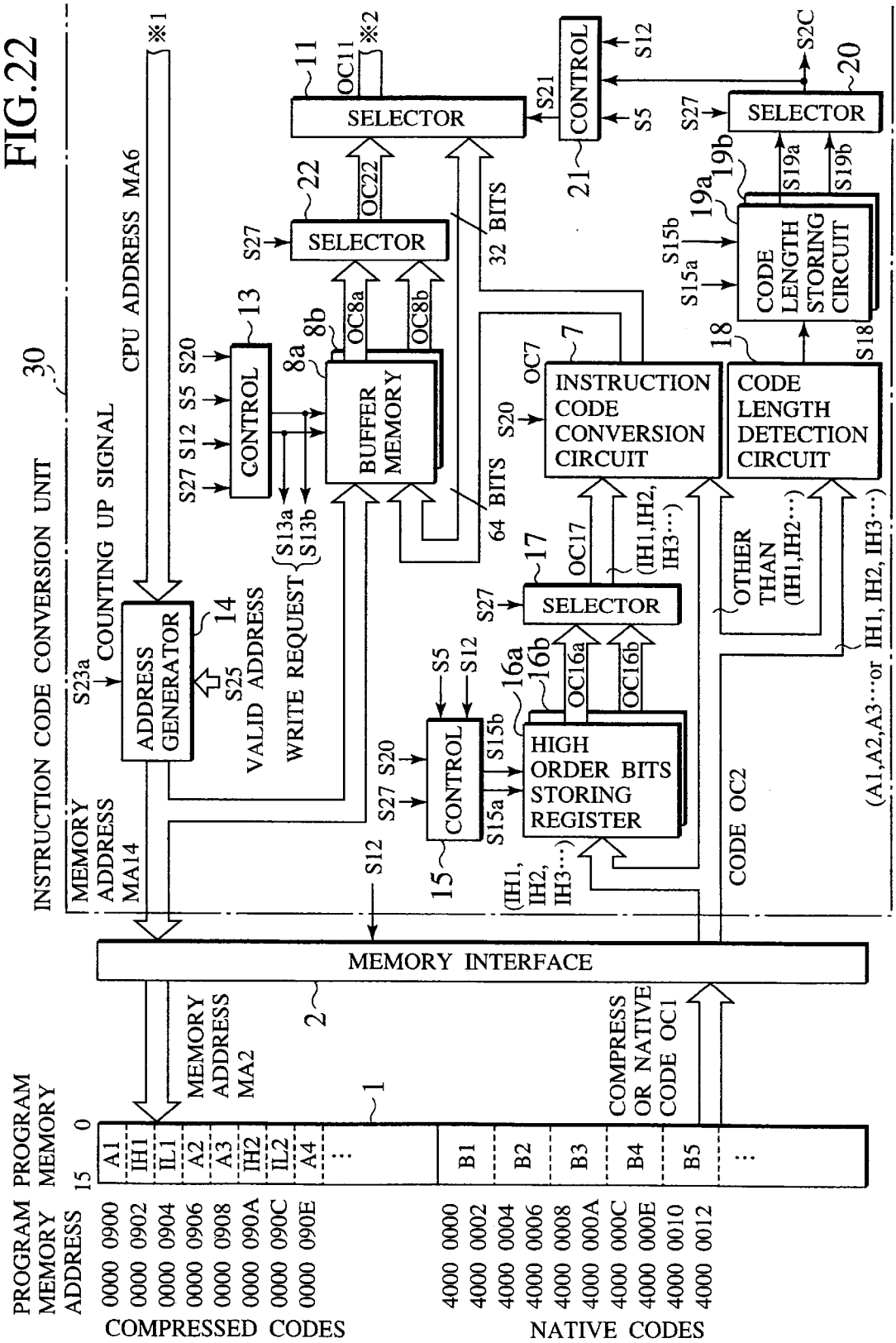
Figure 23:
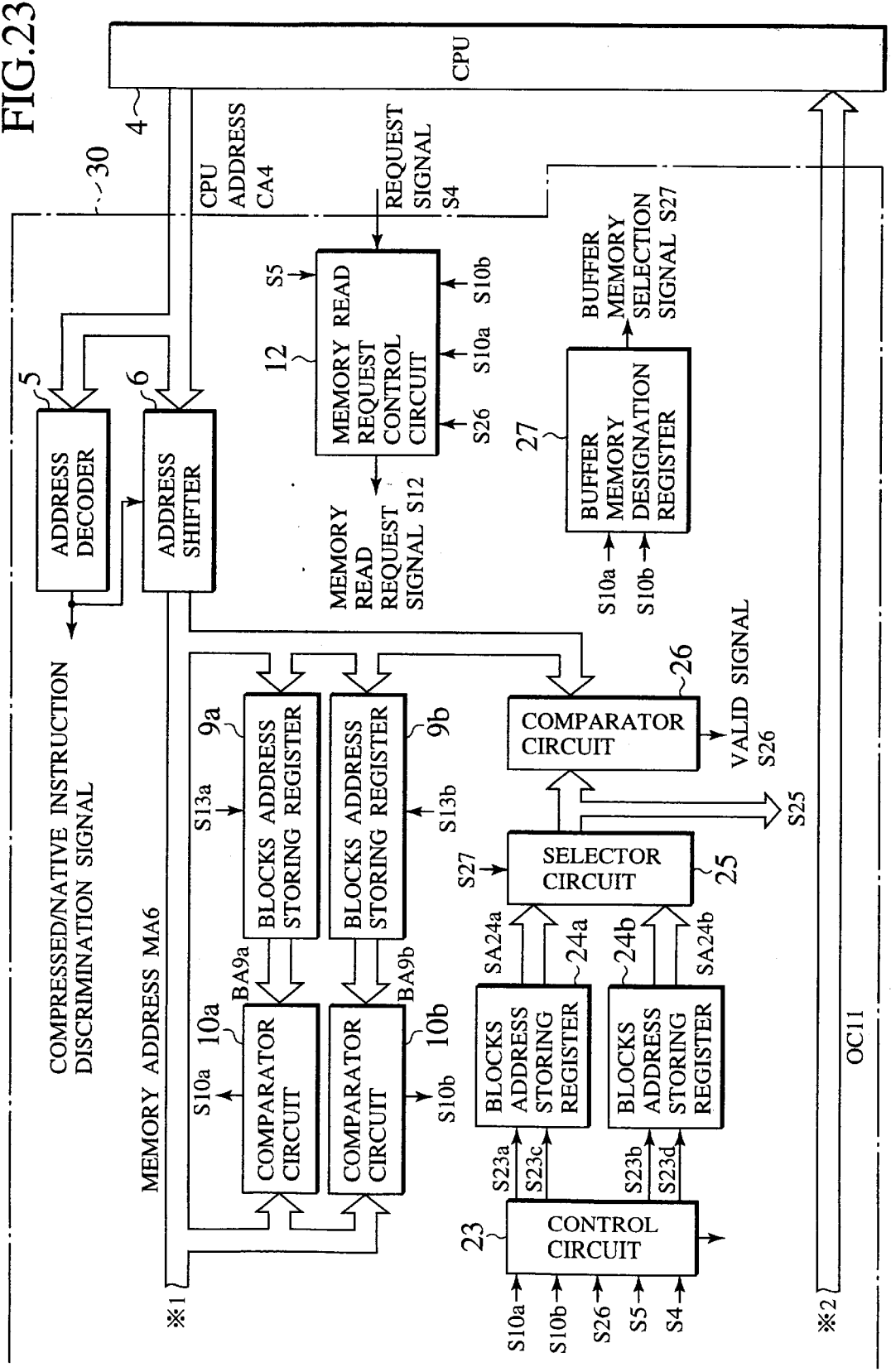

FIG. 22 and FIG. 23 are block diagrams showing the entire configuration of an exemplary information processing system capable of handling mixed sequences of 16-bit instruction codes and 32-bit instruction codes 32.

DETAILED DESCRIPTION OF EMBODIMENTS

In the following explanation, several embodiments of the present invention will be explained in details with reference to figures.

Figure 2:
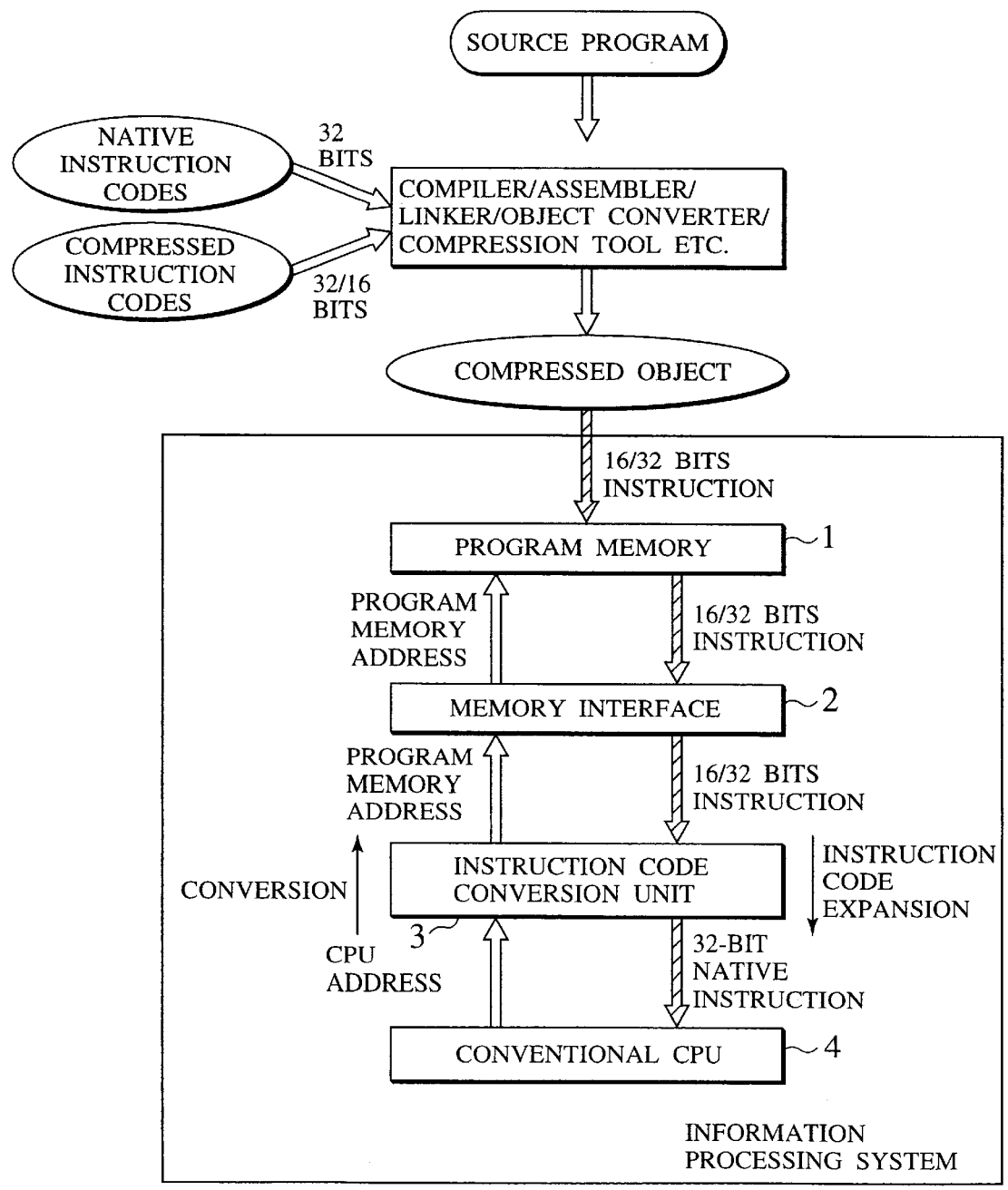
FIG. 2 is a block diagram showing an information processing system in accordance with an embodiment of the present invention.

FIG. 2 is a block diagram showing an information processing system in accordance with an embodiment of the present invention.

In the figure, the information processing system is composed of a program memory 1, a memory interface 2, an instruction code conversion unit 3 and the processor (CPU) 4. Particularly, an existing processor as selected is used as the processor 4 without modification However, the program (an instruction code sequence) to be executed by the processor 4 is compressed by means of a compression software in order to improve the efficiency of coding of the program and reduce the program memory as required for storing the program. The object code (the compressed instruction code sequence) as generated is stored in the program memory 1. The program memory 1 may be a memory provided separate from the processor chip or a built-in memory implemented within the processor chip. In the case where the program memory 1 is a built-in memory implemented within the processor chip, the memory interface and the instruction code conversion unit also have to be implemented within the processor chip.

In accordance with this embodiment, the addresses as outputted from the processor 4 for fetching instruction codes (the processor addresses) are interrelated with the addresses to be input to the program memory 1 (the program memory addresses) in order that a processor address is converted to a corresponding program memory address by a simple operation (the shift operation). The instruction code conversion unit serves to convert a processor address to a program memory address in response to an instruction code reading request as output from the processor 4. The width of the bus for use in transferring data between the processor 4 and the instruction code conversion unit is 32 bits. The width of the bus for use in transferring addresses from the processor 4 to the instruction code conversion unit is 32 bits. The address signal as converted is used to access to the program memory 1 through the memory interface 2 in order to fetch a compressed instruction code. In this case, the width of the bus for use in transferring data between the instruction code conversion unit and the memory interface 2 is 16 bits. The width of the bus for use in transferring addresses from the instruction code conversion unit to the memory interface 2 is 32 bits. Also, the width of the bus for use in transferring data between the memory interface 2 and the program memory 1 is 16 bits. The width of the bus for use in transferring addresses from the memory interface 2 to the program memory 1 is 32 bits. The compressed instruction code as read is expanded to the native instruction code, which can be executed by the processor 4, by means of the instruction code conversion unit 3 located between the processor 4 and the memory interface 2. The processor 4 then executes an expanded instruction code. The expanded instruction code is an native instruction code of the processor 4.

Figure 3A:
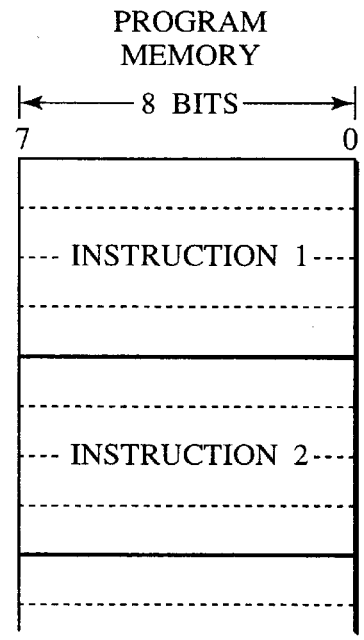
FIG. 3 is a schematic diagram showing the interrelation between the addresses of the program memory and the addresses as output from the processor.
Figure 3B:
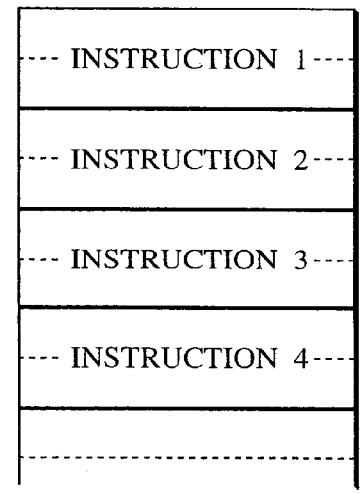

The addresses of the program memory 1 and the addresses as output from the processor 4 are interrelated in a simple fashion as illustrated in FIG. 3. For example, in the case where the processor 4 has fixed-length 32-bit instruction codes and the compressed instruction codes are 16-bit fixed instruction codes, the addresses of the processor 4 are multiples of 4 while the addresses of the program memory 1 are multiples of 2 as illustrated in FIG. 3(a) and FIG. 3(b). However, the processor 4 need not be modified to output the addresses of multiples of 2. The processor 4 can output the addresses of multiples of 4 to receive the fixed-length 32-bit instruction codes by making use of the instruction code conversion unit 3 which serves to shift the processor address by 1 bit to the right (to the low order bit) to generate the program memory address as illustrated in FIG. 3(b). The addresses given to the program memory 1 are converted into the addresses of multiples of 2 by means of the instruction code conversion unit 3. Namely, the instruction code conversion unit 3 halves a processor address by shifting it to the right and output it as a program memory address.

More specifically explained, in the case where the processor 4 implemented with fixed-length 32-bit instruction codes is used with the 16-bit fixed compressed instruction codes, the processor 4 output addresses with low order four bits, for example, as 0h→4h→8h→Ch (in hex) in order to fetch native 32-bit instructions. On the other hand, the program memory 1 stores the corresponding 16-bit instruction codes in the addresses with low order four bits as 0h→2h→4h→6h in this order, as obtained by shifting the addresses as output from the processor 4 by 1 bit to the right, on the assumption that the fifth bit of the processor address as counted from the least significant bit is 0. If the fifth bit of the address as counted from the least significant bit is 1, the corresponding 16-bit instruction codes is stored in the addresses with low order four bits as 8h→Ah→Eh→0h in this order. In the following description, it is assumed that the fifth bit of the address as counted from the least significant bit is 0 for the sake of clarity in explanation. If the address as output from the processor 4 has low order four bits of 4h, the corresponding 16-bit compressed instruction code is fetched from the address having low order four bits of 2h. The 16-bit compressed instruction code is converted by the instruction code conversion unit 3 into the corresponding 32-bit instruction code, which can be executed by the processor 4. The processor 4 then executes the 32-bit instruction code followed by incrementing the address to be output to have low order four bits of 8h.

Figure 4A:
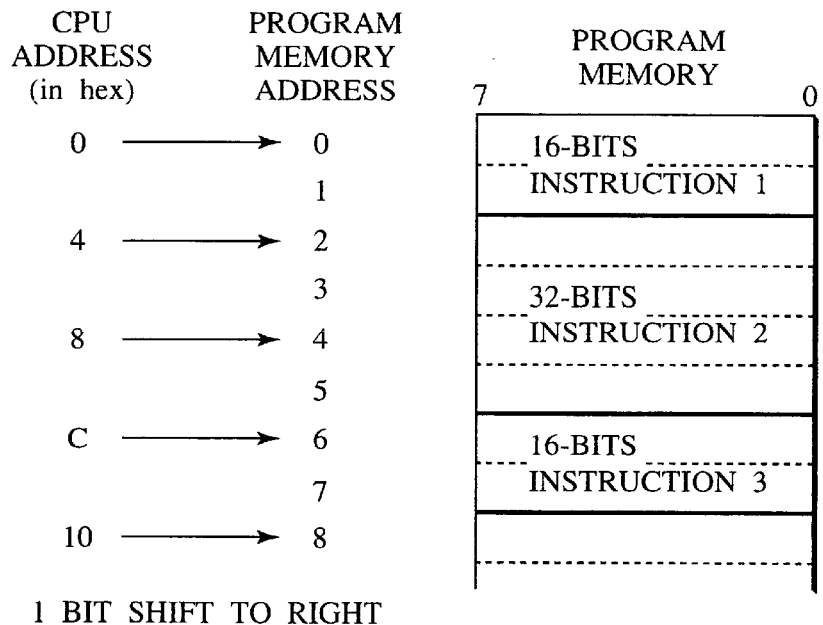
FIG. 4 is a schematic diagram showing the interrelation between the addresses of the program memory and the addresses as output from the processor.

Next, explanation will be made in the case that the compressed instruction codes is variable-length codes composed of 16-bit instruction codes and 32-bit instruction codes as illustrated in FIG. 4(a) rather than 16-bit fixed compressed instruction codes.

Figure 4B:
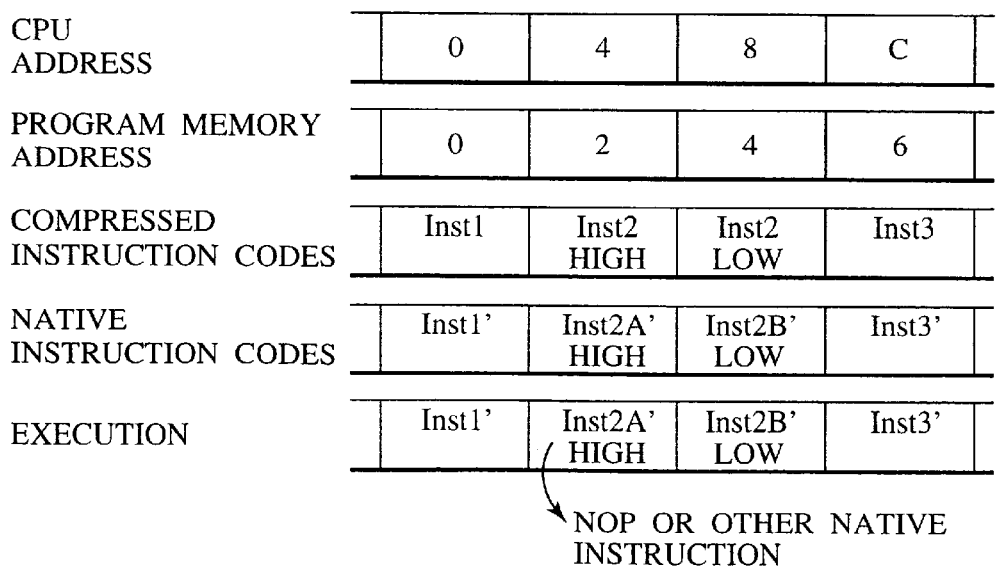

In the case of the variable-length codes, there may be the case where a 32-bit compressed instruction code (instruction 2) in the addresses having low order four bits of 2h and low order four bits of 4h as illustrated in FIG. 4. When the instruction 2 is to be fetched, the processor 4 outputs an address having low order four bits of 4h, which is shifted to the right and outputted to the program memory 1 as an address having low order four bits of 2h by means of the instruction code conversion unit 3 as illustrated in FIG. 4(b). The instruction code conversion unit 3 then receives the high order 16 bits of the corresponding 32-bit compressed instruction code (the instruction 2) from the program memory 1. When it is detected that the high order 16 bits is the high order 16 bits of a 32-bit compressed instruction code, the instruction code conversion unit 3 outputs a 32-bit "NOP" instruction which performs no operation. The processor 4 executes the 32-bit "NOP" instruction to increment the current addresses to have low order four bits of 8h. Then, the next 16 bits, i.e., the low 16 bits of the 32 bit compressed instruction code (the instruction 2) is fetched from the address having low order four bits of 4h which is generated by shifting the address having low order four bits of 8h to the right and given to the program memory 1. The 32-bit compressed instruction code thus obtained is converted into the corresponding 32-bit native instruction code (the instruction 2B') of the processor 4 and transferred to the processor 4 by means of the instruction code conversion unit 3. The processor 4 executes the 32-bit native instruction code 2B' and the current addresses is incremented to have low order four bits of Ch. The correspondence of the program memory address to the processor address is maintained simplified in this manner by executing a 32-bit "NOP" instruction.

Figure 5A:
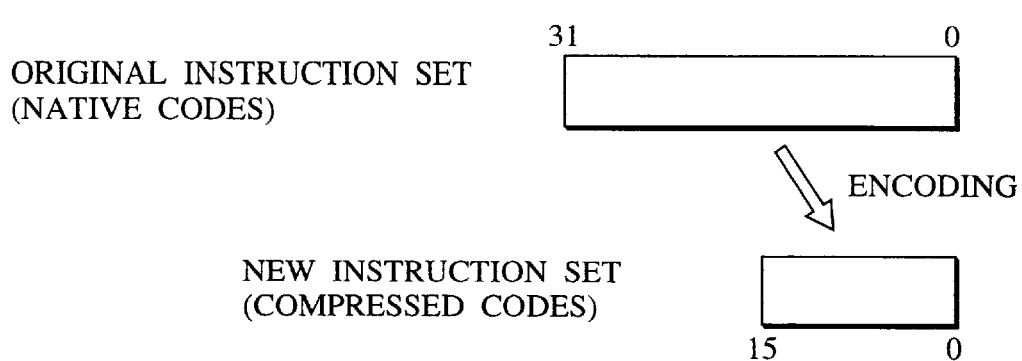
FIG. 5 is a schematic diagram showing examples of compressing native instruction codes.
Figure 5B:
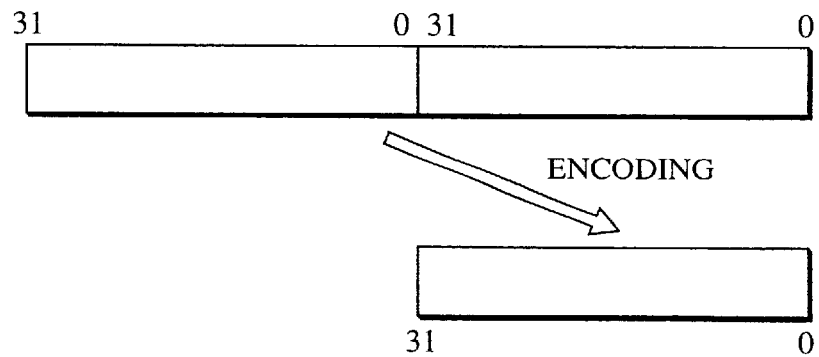

Some 32-bit compressed instruction may be converted into a preceding 32-bit native code 2A' other than the 32-bit "NOP" instruction and a subsequent 32-bit native instruction code 2B'. In this case, two 32-bit native instruction codes (64 bits altogether) are compressed into one 32-bit compressed instruction code as illustrated in FIG. 5(b). On the other hand, in the case where one 32-bit compressed instruction code is converted into a preceding 32-bit "NOP" instruction and a subsequent 32-bit native instruction code, it takes two instruction cycles to complete execution of the 32-bit compressed instruction code. This conversion is therefore employed in the case where the priority is given to the efficiency of coding rather than the execution time.

The above description is made in the case where a little-endian (byte(O) rightmost) system is employed. In the case where a big-endian (byte(O) leftmost) system is employed, the 32-bit compressed instruction code is fetched by firstly reading low order 16 bits and next reading high order 16 bits.

Also, the simplification of the interrelation between the program memory address and the processor address makes it possible to dispense with correspondence information stored in the program memory 1 for the address conversion, as the sixth conventional example as described above, and therefore to reduce the time required for expanding the compressed instruction codes by the time which is otherwise required for reading and handling the address correspondence information. Furthermore, in the case of the sixth conventional example, the address correspondence information is stored in the program memory so that the efficiency of coding is reduced. However, in accordance with the present invention, there is no need for the address correspondence information stored in the program memory to improve the efficiency of coding.

On the other hand, generally speaking, the amount of information of the compressed instruction codes is reduced by the compression as well as the number of instructions, as compared with the original instruction codes of the processor 4. Because of this, the compiler has to be designed to compile a target program, which is to be compressed, with a subset of the original instruction set. Accordingly, due to the fact that some native instruction codes can not be used for compilation and have to be replaced by combinations of compressed instruction codes, it may be the case where a program is compiled by the use of compressed instruction codes to have a size larger than that in the case where the same program is complied by the use of native instruction codes. However, some native instruction codes include several bits which, are not used. For example, some instruction codes include operands each of which consists of a few low order bits indicative of necessary data and high order meaningless bits fixed to all 0 or all 1. It has therefore only little effect on the efficiency of coding that the compressed instruction code set is a subset of the original instruction set. Accordingly, in many cases, compilation by the use of compressed instruction codes can generate a size smaller than that generated by compilation by the use of native instruction codes. Needless to say, the compression is performed only for such a program or part of a program of which the compression is effective. For example, the operands of many instruction codes can be represented by 1 to 8 bits. However, many native instruction codes include data fields of 16 bits and thereabout. Accordingly, a program may usually include a number of 32-bit native instruction codes each of which has redundancy of 15 to 8 bits. The redundancy bits are eliminated in the compressed instruction code set in order to improve the compression efficiency.

Figure 6:
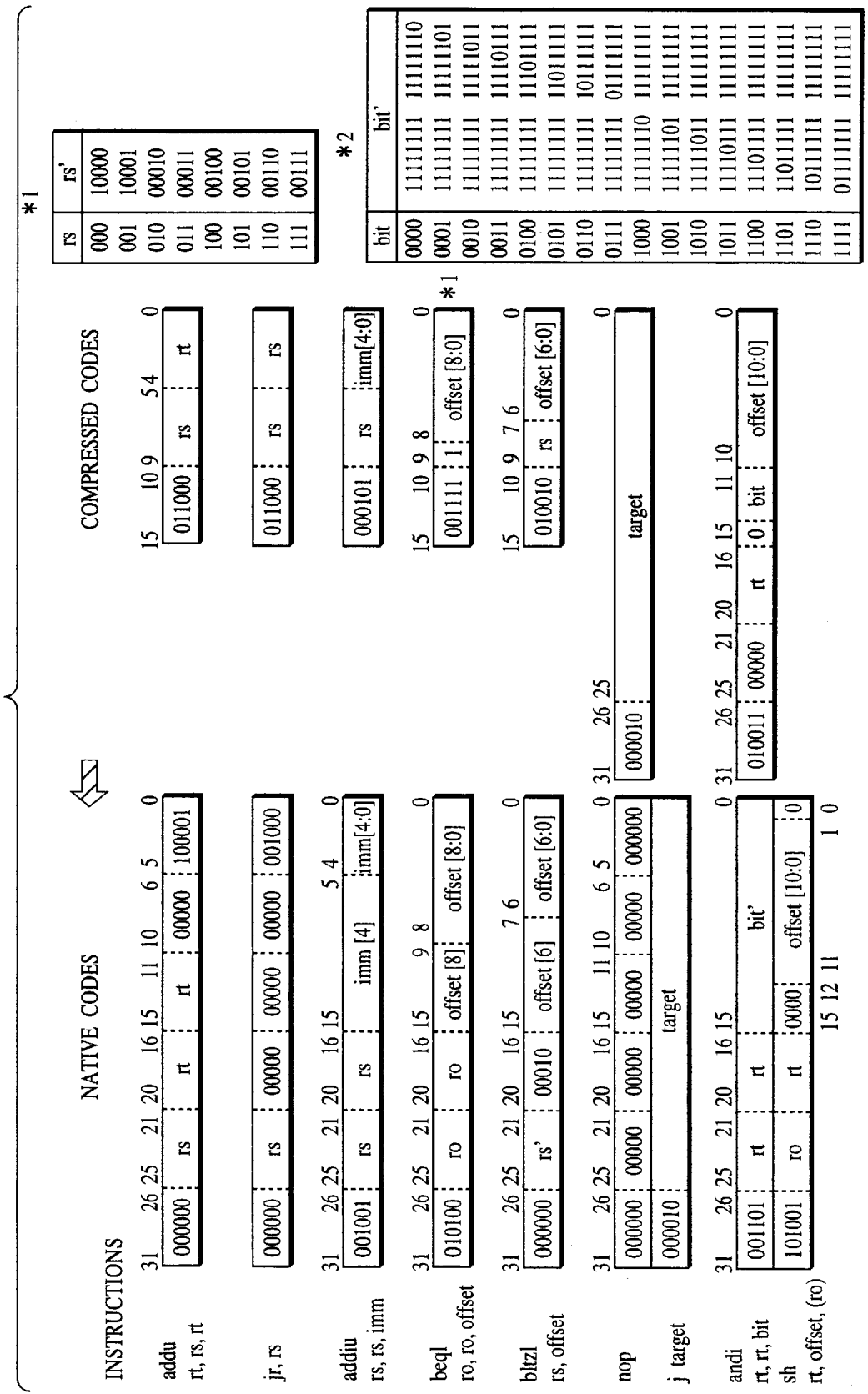
FIG. 6 is a schematic diagram showing exemplary compressed instruction codes and the 32-bit native instruction codes which are obtained by expanding the exemplary compressed instruction codes.

The compression can be performed not only by compressing a 32-bit native instruction code to a compressed instruction code but also by compressing a plurality of native instruction codes to a smaller number of compressed instruction codes. For example, two native instruction codes can be compressed into one compressed instruction code in order to improve; the compression efficiency. FIG. 6 is a schematic diagram showing exemplary compressed instruction codes and the 32-bit native instruction codes which are obtained by expanding the exemplary compressed instruction codes.

The compression will be explained as follows with reference to FIG. 7.

First, a compiler compiles a source text of the target program as written in a compiler language (a high level language such as C-language) to generate an assembler source text file consisting of native instruction codes of the subset. An assembler then converts the assembler source text file to a relocatable object file, which is then processed by a linker to generate an absolute object file consisting of native instruction codes. In the case where compression is not performed, the above described absolute object file is furthermore processed by an object converter to a final object file in the hex form and the like. In the case where compression is performed in accordance with the embodiment of the present invention, the above described absolute object file consisting of native instruction codes is compressed by converting it into an absolute object file consisting of compressed instruction codes by means of a compression software. The absolute object file as compressed is furthermore processed by an object converter to a final object file in the hex form and the like. The final object file is stored in the program memory 1.

Figure 8A:
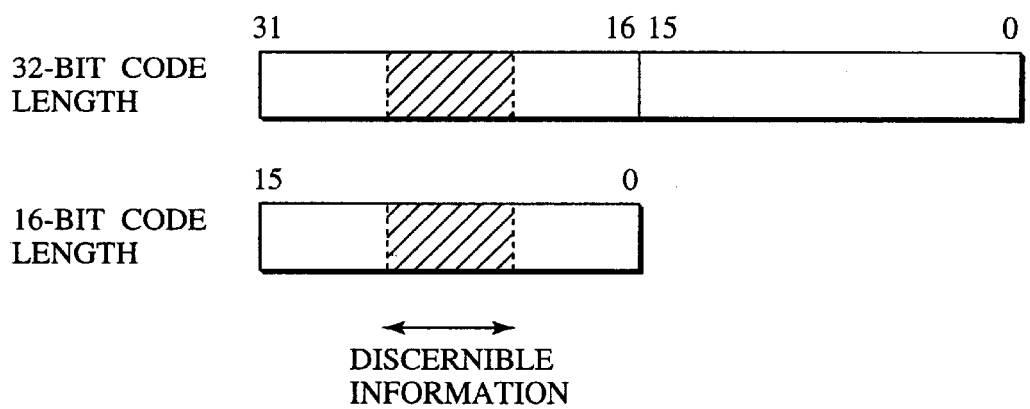
Figure 8B:
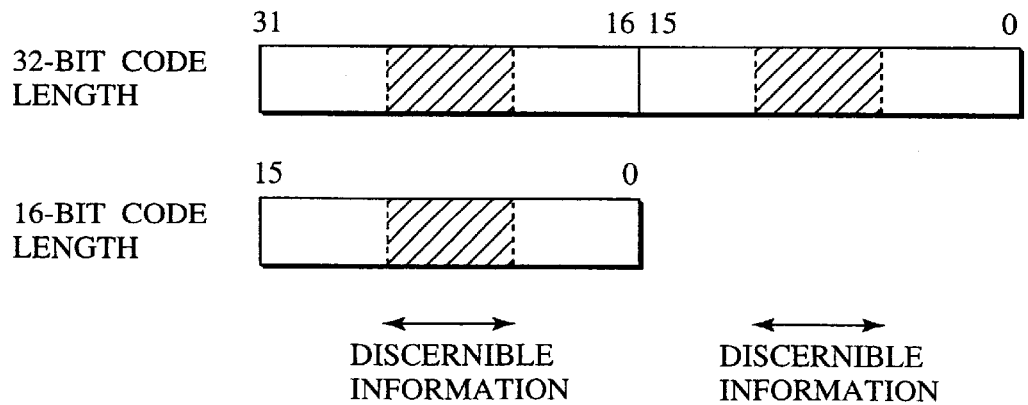

It is possible to design the compressed instruction codes to have the same bit length (fixed-length codes) or to have a plurality of bit lengths (variable-length codes). In the case of the variable-length codes, there is an encoding method in which the bit length of an instruction is determined only by decoding high order bits, for example, by the use of part of the high order 16 bits of a 32-bit native instruction code for detecting the bit length thereof as illustrated in FIG. 8(a). On the other hand, there is another encoding method in which the bit length of an instruction is determined by decoding any part of a 32-bit native instruction code as fetched, for example, by the use of part of the high order 16 bits or the low order 16 bits of a 32-bit native instruction code for detecting the bit length thereof as illustrated in FIG. 8(b). Generally speaking, the former encoding method is implemented with narrower opcode fields indicative of the types of the instructions so that the efficiency of coding becomes high.

When the former encoding method is employed, it is necessary to convert one block of a predetermined size of the memory space rather than to convert one compressed instruction code at a time as illustrated in FIG. 9 and FIG. 10. This is because, even when an exception occurs such as an interrupt request during a 32-bit compressed instruction code is handled, the control have to be returned to the correct address, in which the exception has taken place, followed by correct conversion of the 32-bit compressed instruction code. For example, in the case where a 32-bit compressed instruction code is expanded to a native code 2A' and a native code 2B' and an exception occurrs while the instruction 2B' is being executed, the control is returned to the address (corresponding to the processor address having low order four bits of 8h) so that the high order 16 bits of the 32-bit compressed instruction code are not fetched again and therefore it is impossible to conduct correct conversion. In order to avoid this problem, the compressed instruction code sequence is divided into a plurality of blocks each of which has the same length while the object code is generated in order that the leading 16 bits of each block contains a 16-bit compressed instruction code or the high order 16 bits of a 32-bit compressed instruction code. It is therefore guaranteed to always conduct correct expansion by starting expansion from the leading 16 bits of each block.

In addition to the above restriction that no 32-bit compressed instruction code can not be located bridging adjacent blocks, there is another restriction on this technique that data can not be located in a block. This is because there is no means for distinguishing between data and an instruction code. If a 32-bit compressed instruction code is located bridging adjacent blocks while the native instruction codes are compressed by means of a compression software, a compressed 16-bit "NOP" instruction is inserted in advance of the 32-bit compressed instruction code. It is possible by increasing the size of the blocks to reduce the possibility that a 32-bit compressed instruction code is located bridging adjacent blocks, i.e., that a compressed 16-bit "NOP" instruction is inserted to a block. However, if the blocks are too large, there have to be provided a large buffer memory for storing the instructions as converted, resulting in an increase in costs. Also, the execution time is influenced by the process of reading and converting a large block at a time. The buffer size is determined, taking into consideration the tradeoff made therebetween.

Next, this embodiment of the present invention will be explained in details with reference to FIG. 11 which is a schematic diagram showing the conversion of the compressed instruction codes and the address thereof in accordance with the present invention, The processor 4 is designed to execute fixed-length 32-bit instruction codes C1, C2, C3 .... A compressed instruction code set of 16-bit and 32-bit variable-length codes A1, A2, A3 ... is provided as the compressed instruction codes for improving the efficiency of coding. The compressed instruction codes are generated by a software as described above as an object file. It is assumed that part of the program source is not compressed. This is because (a) some function may not be implemented without some native instruction codes for which are not provided compressed instruction codes (while this is depending upon the number of the native instruction codes and the code lengths of the compressed instruction codes, it is the case, for example, that a compressed instruction code is not provided for a native instruction code which is used to handle a particular resource of the processor), (b) the number of instructions belonging to the compressed instruction code set is smaller than that belonging to the native instruction code set so that the number of the constituent steps of the compressed instruction code sequence tends to increase and therefore the compression becomes sometimes not effective, and (c) since the compressed instruction codes is executed after expanded so that the execution time thereof tends to increase and therefore it is impossible to perform compression for part of the target program which requires high speed operation. It is undesirable or impossible to perform compression in the above cases (a) to (c). Accordingly, in many cases, a native instruction code sequence (the fixed-length 32-bit instruction codes B1, B2, B3 ... ) is also generated as well as a compressed instruction code sequence. The compressed instruction code sequence and the native instruction code sequence are stored in the program memory 1 together. The program memory may be composed of a plurality of memory chips.

The variable-length codes A1, A2, A3 ... have been encoded in which opcodes thereof is located in high order bits. In this case, in order to determine the bit lengths of the respective instruction codes, the program memory in which compressed instruction codes are stored is divided into blocks each of which is capable of storing 32 instructions of 16-bit instruction codes An object file is generated by the software as described above in order that the leading bits of each block are occupied by high order bits of the compressed instruction codes and that data is not included in each block as illustrated in FIG. 12 and FIG. 13. FIG. 12 is a schematic diagram showing the relationship between the address of the program memory and the address of the buffer memory. FIG. 13 is a schematic diagram for explaining the restriction that no 32-bit compressed instruction code can not be located bridging adjacent blocks.

When the instruction code A1, A2 and A3 . . . (compressed instruction codes) and B1, B2 and B3 . . . (native instruction codes) are read out from the program memory 1, the addresses as output from the processor 4 are used for distinguishing between the compressed instruction codes and the native instruction codes. For example, when an address is located within a predetermined address range in the address space, the address is considered to point to a compressed instruction code while otherwise considered to point to a native instruction code. The predetermined address range in the address space may be fixed in the hardware (the instruction code conversion unit 3). However, an appropriate register may be provided in the instruction code conversion unit 3 in order to preset the predetermined address range in the initialization routine of the program, when running, in order to improve the efficiency of coding. In this example, the range of addresses is predetermined for distinguishing between the compressed instruction codes and the native instruction codes.

For example, the program areas of the compressed instruction codes and the native instruction codes are distinguished by the use of the high order 8 bits of each address as output from the processor 4. The compressed instruction codes of the program are stored in the address range having high order 8 bits of 04h to 7Fh while the native instruction codes of the program are stored in the remainder of the range of addresses. The instruction code conversion unit 3 determines whether or not an address points to a compressed instruction code and, If compressed, outputs the instruction code after expansion to the processor 4 while otherwise outputs the instruction code without expansion.

Alternatively, part of each instruction code is designed to indicate the compression. For example, the compressed instruction code set can be designed in order that several high order bits of any compressed instruction code are different from corresponding several nigh order bits of any native instruction code. In this case, compressed instruction codes and native instruction codes can be freely mixed in an instruction sequence so that the efficiency of coding may be improved. Furthermore, a particular register may be provided for distinguishing between the program areas of the compressed instruction codes and the native instruction codes. The particular register can be accessed by I/O instructions of the processor 4. Alternatively, the particular register can be controlled to be set/reset in response to a certain branch instruction(s) if the execution of the certain branch instruction can be detected in a location outside of the processor 4.

A furthermore alternative is the use of an MMU (Memory Management Unit). In this case, property registers are provided for storing property values in correspondence with the addresses as outputted from the processor 4. The property values are used for indicating whether the instruction of the current address is a compressed instruction or a native instruction. The property value stored in the property register can be set by the input/output instruction of the processor 4. It is possible to make use of external signals for the purpose of determining whether the instruction of the current address is a compressed instruction or a native instruction. For example, in the case where a plurality of program memories are provided, each program memory is given a property indicative that it is responsible for storing compressed instruction codes or native instruction codes. The instruction code conversion unit 3 can distinguish between the compressed instruction codes and the native instruction codes by the property of the program memory currently accessed.

The signal outputted from the processor 4 for fetching instructions depends upon the architecture of the processor. In the cases other than the Harvard Architecture, the processor 4 outputs a signal indicative of if it is either data or an instruction which is accessed together with a signal indicative of reading and an address signal. However, if the request signal for fetching instruction is separated from the request signal for fetching data, there is no need for the signal indicative of if it is either data or an instruction which is accessed. Also, in the case where separate memories are provided respectively for storing a program and for storing data, it can be determined whether or not the memory access is conducted to fetch an instruction by decoding the address signal so that there is no need for the signal indicative of if it is either data or an instruction which is accessed. In this example, the range of addresses is used for determining whether or not the memory access is conducted to fetch an instruction.

On the other hand, in the case of the Harvard Architecture, since the address signal for fetching instruction are separated from the address signal for fetching data, there is no need for the signal indicative of if it is either data or an instruction which is accessed.

When there is a request of the processor 4 for fetching an instruction, the address signal as output from the processor 4 is decoded in order to determine that the address points to an instruction and whether a compressed instruction code or a native instruction code is accessed. If there is a request for fetching a compressed instruction code, the top address of the block is calculated from the address signal as output from the processor 4. In this example, one block consists of 32 16-bit instruction codes so that low order seven bits are masked to "0". Furthermore, the top address is shifted to the right. The instruction code conversion unit 3 then sends a request to the memory interface 2 for sequentially reading one block in the program memory 1 from the address as shifted. The memory interface 2 accesses to the program memory 1 in response to the request of the instruction code conversion unit 3, reads the compressed instruction codes and transferrs them to the instruction code conversion unit 3.

Since the leading bits of the block are occupied by high order bits of a compressed instruction code, it is possible to read the entirety of the compressed instruction code located in the top of the block by decoding the opcode thereof. The compressed instruction code is expanded to the corresponding 32-bit native instruction code. For example, if the compressed instruction code located in the top of the block is a 16-bit instruction code, it is immediately expanded to a 32-bit native instruction code. If the compressed instruction code located in the top of the block is a 32-bit native instruction code, the high order 16 bits of the compressed instruction code is read out from the top address of the program memory 1 followed by detecting the bit length of 32 bits. The low order 16 bits of the compressed instruction code is then read out from the top address+2, which is the next address, followed by expanding the compressed instruction code to two 32-bit native instruction codes, in the case where the 32-bit compressed instruction code is functionally corresponding to one native instruction code, the 32-bit compressed instruction code is expanded in order that one of the two 32-bit native instruction codes is the 32-bit "NOP" instruction. This is because it is required that the processor address and the program memory 1 are related to each other in a one-to-one correspondence and that the address conversion can be simply conducted only by shifting one bit.

The expanded instruction codes are stored in a buffer memory provided in the instruction code conversion unit 3. The size of the buffer memory is required to accommodate 32 bits×32 instructions in this case. After completing the expansion of the compressed instruction code located in the ton of the block, the next compressed instruction code is read out from the program memory 1, expanded to a native instruction code and stored in the buffer memory in the same manner. When the compressed instruction code corresponding to the output address from the processor 4 is expanded, the native instruction code as expanded is transferred to the processor 4, which then execute the native instruction code.

After transferring the native instruction code to the processor 4, the instruction code conversion unit 3 continues to sequentially read and expand compressed instruction codes and to store the native instruction codes. However, when an exception occurrs such as an interrupt request or the processor 4 executes a branch instruction so that the output address from the processor 4 is out of the block, the instruction code conversion unit 3 halts the expansion of compressed instruction codes of the block and immediately initiate the expansion of compressed instruction codes of a new block to which the control is transferred. The time of the expansion is thereby prevented from being elongated by this control. However, the control may be transferred to the remote address after completing the expansion process of the compressed instruction codes having already been fetched from the program memory. Meanwhile, if there is repeated a loop bridging adjacent blocks, the expansion process of the same block is repeated. This problem can be solved by providing at least two blocks in the buffer memory. The size of the buffer memory may be further increased depending upon the size of the loop and the distribution of the distances of loops from the respective branch locations. The distribution of the distances of loops from the respective branch locations is depending upon the program. However, since the instruction set architecture of the processor 4 is dominant on the distribution. The optimal size of the buffer memory can be determined in accordance with the instruction set architecture of the processor 4.

If there is a request for fetching a native instruction code, the addresses as output from the processor 4 is transferred to the memory interface 2 without conversion followed by reading the corresponding native instruction code from the program memory 1. The native instruction code as read out is transferred to the processor 4 as it is. On the other hand, if there is a request for accessing the program memory 1 to read/write data rather than fetching an instruction, the addresses as output from the processor 4 is transferred to the memory interface 2 without conversion followed by reading data from or writing data to the program memory 1.

As illustrated in FIG. 14, the buffer memory is provided with registers indicative of the following additional information, together with memory elements (registers) for storing expanded native instruction codes, for the purpose of reusing the native instruction codes having been stored in the buffer memory, i.e., for dispensing with expansion of compressed instruction codes when the expanded instruction codes have already been stored in the buffer memory.

(a) A register is provided for each block in order to indicate the addresses of the processor corresponding to the expanded instruction codes stored in the block. The register serves to store the high bits of the addresses and is called the block address storing register. (b) A register is provided in order to indicate whether or not an expanded instruction code is stored in the buffer memory. The register is implemented as one valid bit provided for each address of the buffer memory. Alternatively, the register is implemented for each block as an effective address storing register having a plurality of bits indicative of the last address to which expanded instruction codes have been stored in the buffer memory from the top address.

If the expanded instruction codes stored in a block for which the expansion has not been completed are recognized invalid, the additional information as explained in (b) is dispensed with. In this case, however, there is provided a one bit register indicative of whether or not the expansion has not been completed for the block. The register as described in the above (b) should be initialized when the system is reset, or when the additional information as described in the above (a) is rewritten in order to indicate all the contents of the buffer memory are invalid. For example, in the former case where the valid bit is provided for each address as described above in order to indicate that an expanded instruction code has been stored in the address of the buffer memory with the valid bit being "1" and that an expanded instruction code has not been stored in the address of the buffer memory with the valid bit being "0", the initialization process serves to reset all the valid bits to be "0". Furthermore, in the latter case where the effective address storing register is provided as described above in order that the effective address storing register is "0" when no expanded instruction code has been stored in the buffer memory, that the effective address storing register is "2" when storing the native instruction code which is obtained by expanding a compressed instruction code from the address having low order bits of "0" (the low order seven bits in this case). When the buffer memory stores the entirety of the block, 40h is set to the effective address storing register. The effective address storing register is initialized to be 0h.

The control is sometimes transferred from a certain block for which the expansion process has been conducted to another block by an exception or a branch instruction which is located in the middle or the last address of the certain block, and then returned to the certain block. When it is detected that the expansion has been conducted by the use of the register group indicative of the additional information as described above, the program memory 1 need not be accessed from the top address thereof, but native instruction codes can be read from the buffer memory which accommodates native instruction codes of two blocks. The response time of the instruction code conversion unit 3 can be thereby improved.

Furthermore, in the case where the expansion process has been conducted to a middle address of a certain block when control is transferred from the certain block and returned to an early address of the certain block, the instruction code conversion unit 3 can output native instruction codes stored in the buffer memory while subsequent compressed instruction codes are read out from the program memory, expanded and stored in the buffer memory.

Since the buffer memory accommodates native instruction codes of two blocks, there has to be provided a register (called the buffer memory designation register in the following description). The buffer memory designation register serves to which block of the buffer memory should be used next as illustrated in FIG. 14. For example, if there are provided two buffer memory blocks each accommodating native instruction codes of one block, the buffer memory designation register is a one-bit register which serves to indicate the use of the buffer memory block 0 if "0" is set thereto and indicate the use of the buffer memory block 1 if "1" is set therein. Any buffer memory block can be used when the system is reset so that the initialization process of the buffer memory designation register can be dispensed with. When compressed instructions are stored in one block, the buffer memory designation register indicates the use of another block. When compressed instructions are stored in the both blocks, the buffer memory designation register is controlled to indicate the use of the block storing older instructions.

In the case of a such program in which interrupt requests and/or overflow exceptions frequently take place, the reuse advantage of the buffer memory can be enhanced by separately providing a plurality of buffer memory blocks for the main routine and for the exception handers. Also, the reuse advantage of the buffer memory can be enhanced by separately providing a buffer memory block(s) for a subroutine which is frequently used such as a subroutines for causing the processor to ignore maskable external interrupts. The type of the current routine can be detected with reference to the address as output from the processor. FIG. 15 is a schematic diagram showing the configuration of the address space of the processor and the configuration of the buffer memory.

In consequence, there are seven key points as described above which are combined as illustrated in FIG. 16 in order to realize a variety of embodiments of the present invention.

Key Point 1: The Code Lengths of the Compressed Instructions

Namely, the compressed instruction set is composed of either fixed-length instruction codes or variable-length instruction codes. In the case of the variable-length codes, there are two types. Any word includes the opcode indicative of the length of the instruction code in accordance with one type while only a particular word of each compressed instruction code includes the opcode indicative of the length of the instruction code in accordance with the other type.

Key Point 2: The Number of the Native Instruction Codes Corresponding to a Single Compressed Instruction Code Namely, one compressed instruction code is expanded to either a single native instruction code or a plurality of native instruction codes. In the case where one compressed instruction code is expanded to a plurality of native instruction codes, there are two types. Said one compressed instruction is always a compressed instruction having a double word length in accordance with one type, and otherwise in accordance with the other type.

Key Point 3: Intermixing of Compressed Instruction Codes and Native Instruction Codes Namely, the compressed instruction codes and the native instruction codes either can or can not be used intermixedly in generating an object file. If the compressed instruction codes and the native instruction codes can be used intermixedly, there are several cases with respect to the means of distinguishing between the compressed instruction codes and the native instruction codes. The address as output from the processor, part of the instruction code, register(s) and external signal lines are used for this purpose.

Key Point 4: Distinguishing Between Data and Instruction Codes

Namely, there are four methods for distinguishing between data and an instruction code as accessed from the processor as described above.

Key Point 5: Expansion Process when Transferring the Control Outside of the Current Block Namely, in the case of an exception, a branch instruction or a jump instruction, the control is may be transferred to the remote address either after completing the expansion process of the compressed instruction codes having already been fetched from the program memory or after immediately aborting the expansion process of the compressed instruction codes having already been fetched from the program memory.

Key Point 6: The Additional Information for the Purpose of Reusing the Buffer Memory Namely, the additional information is provided in registers of several types. One type is provided as a valid bit for each address indicative of whether or not an expanded instruction code is stored in the address. Another type is provided as a register for each block indicative of to what address expanded instruction codes are stored in the block. A further type is provided as a register for each block indicative of whether or not the expansion process is completed throughout the block.

Key Point 7: Expanding Codes Ahead

Namely, in the case where the compressed instructions are not expanded yet to the last address of a block, the expansion process is either continued speculatively or postponed until requested.

The above described key points are related to the instruction code conversion unit 3 located between the processor 4 and the memory interface 2 for accessing the program memory 1 (internal or external memory). However, the instruction code conversion unit 3 can alternatively be located between the processor 4 and an instruction cache interface for accessing an instruction cache memory. In this case, the program memory 1 and the memory interface 1 as illustrated in FIG. 2 are replaced by an instruction cache memory and an instruction cache interface respectively.

If the program memory is implemented with an internal program memory or an instruction cache memory, the bandwidth of the memory interface becomes wider so that the time required for reading the memory, when expanding compressed instruction codes, can be reduced by fetching a plurality of compressed instruction codes at a time, resulting in a shorter time required for the expansion process.

If the program memory is implemented with an external cache memory, the reading penalty when initiating the expansion process of a block is hidden by designing the refill size of the instruction cache memory and the size of the buffer memory to be equal to each other so that compressed instruction codes are requested always from the top address of the block when expansion of a compressed instruction code in the mid of the block.

Also, in place of the buffer memory exclusively provided for this purpose, a secondary cache memory or a primary cache memory can be used resulting in the advantage in costs and in the time for fetching instructions.

In the configuration as illustrated in FIG. 11, one 32-bit native instruction code is generated per 16 bits of compressed instruction codes. The efficiency of coding can be furthermore increased by generating a plurality of native instruction codes per 16 bits of compressed instruction codes when expanded. A subroutine call can be used to expand one compressed instruction code into a plurality of native instruction codes in order to maintain the simplification of interrelation between the processor addresses and the memory addresses. For example, in the case where one 32-bit native instruction code is expanded to four native instruction codes, the expansion is performed to generate six native instruction codes including the subroutine call instruction and the return instruction. The subroutine is located in a predetermined address range, i.e., a reserved address space which is exclusively used by the instruction code conversion unit.

More specifically speaking, in the case of the compressed instruction code as illustrated in FIG. 17 for performing a bit setting operation to a variable stored in the program memory 1, the compressed instruction code is expanded to five native instruction codes, i.e., the subroutine call instruction+the load instruction+the OR instruction+the return instruction+ the store instruction. The leading two instructions, i.e., the subroutine call instruction and the load instruction as expanded are located in the addresses of the buffer memory corresponding to the address of the 32-bit native instruction code. However, the remaining three instructions, i.e., the OR instruction, the return instruction and the store instruction have been written in a three words from the address X of a memory (ROM) exclusively provided for subroutines in advance. The ROM is implemented in the instruction code conversion unit 3. This kind of the compressed instruction codes and such address X are interrelated in a one-to-one correspondence. The one-to-one correspondence makes it possible to resume the subroutine by reading an instruction code from an address of the ROM rather than the corresponding compressed instruction code, when an exception occurrs while the subroutine is running, and transferring the instruction code to the processor 4.

The subroutine memory may be composed of a RAM rather than the ROM. The subroutine memory is designed to accommodate the entirety of the native instruction codes generated by expanding the compressed instruction codes of this kind. When the instructions generated by expanding a compressed instruction code and located in a subroutine are simple, a logic circuit may be used to replace the ROM. For example, in the case of the bit setting operation as described above, there are three instruction codes. The first instruction is (a) the OR instruction having an immediate operand in which a desired bit position(s) is set to a "1"(s) while the remaining bit(s) is set to a "0"(s). The immediate operand and the address X are provided in a one-to-one correspondence so that the implementation is possible by the use of a simple logic circuit. When the immediate operand is related to the 4th to 6th bits of the address X, the immediate operand is 0000000000000001b (binary number) in the case where the 4th to 6th bits of the address X is 000b. The opcode field of the OR instruction is a fixed value. For example, in the case of an instruction code set, the opcode of the OR instruction is 0011010000100001b (binary number). The second instruction is (b) the store instruction including a base register number and an offset value for designating the address of the memory. If the base register number and the offset value are related to the address X, the implementation is possible by the use of a simple logic circuit. In the case of the example as illustrated in FIG. 17. the base register number is fixed to r0. The third instruction is (c) the return instruction consisting of a fixed opcode so that the implementation is possible by the use of a simple logic circuit which can be generated with reference to the address X.

Next, the embodiment in accordance with the present invention will be explained in details.

FIG. 18 is a block diagram showing the entire configuration of an exemplary information processing system in accordance with the present invention in which the instruction code conversion unit 3 as illustrated in FIG. 11 is specifically described in details.

In FIG. 18, the information processing system is composed of the program memory 1 which may be composed of a plurality of memory chips in which are stored a plurality of the 16-bit fixed compressed instruction codes A1, A2, A3 . . . and the fixed-length 32-bit native instruction codes B1, B2, B3, . . . the memory interface 2 for reading the compressed instruction codes from the program memory 1, the instruction code conversion unit 3 for converting the compressed instruction codes to the native instruction codes and the processor (CPU) 4 serves to execute the fixed-length 32-bit native instruction codes. The instruction code conversion unit 3 is composed of an address decoder 5, an address shifter 6, an instruction code conversion circuit 7, a buffer memory 8, block address storing register 9, comparator circuit 10, a selector circuit 11, a memory read request control circuit 12 and a control circuit 13. The address decoder 5 serves to decode an processor address CA4 as outputted from the processor 4, determine whether the processor address CA4 falls in the compressed instruction code address range or the native instruction code address range and output a compressed/native instruction discrimination signal S5. The address shifter 6 serves to output the processor address CA4 as shifted to the right by 1 bit (32 bits÷16 bits÷2=1 bit) when the processor address CA4 falls in the compressed instruction code address range and output the processor address CA4 with no shift when the processor address CA4 falls in the native instruction code address range. The instruction code conversion circuit 7 serves to output the native instruction codes C1, C2, C3 . . . by converting the 16-bit fixed compressed instruction codes A1, A2, A3 . . . as read from the program memory 1 through the memory interface 2 or output the fixed-length 32-bit native instruction codes B1, B2, B3 . . . as read from the program memory 1 through the memory interface 2 without conversion in accordance with the compressed/native instruction discrimination signal S5 which is the result of decoding the 16-bit fixed compressed instruction codes A1, A2, A3 . . . and the fixed-length 32-bit native instruction codes B1, B2, B3 . . . by means of the address decoder 5. The buffer memory 8 serves to store the native instruction codes C1, C2, C3 . . . as converted by means of the instruction code conversion circuit 7. The block address storing register 9 serve to store the high order bits of the memory address of the program memory 1 in which are stored the compressed instruction codes which are converted to the native instruction codes, which are then stored in the buffer memory 8. A valid bit is provided for each entry of the buffer memory 8 for storing compressed instruction codes. The comparator circuit 10 serves to compare the high order bits of the output address from the address shifter 6 with the address stored in the block address storing register 9. The selector circuit 11 serves to select the native instruction codes B1, B2, B3 . . . or the native instruction codes C1, C2, C3 . . . which are read from the buffer memory 8 corresponding to the low order six bits of the output address from the address shifter 6 in accordance with the compressed/native instruction discrimination signal S5 the result of decoding by the address decoder 5. The memory read request control circuit 12 serves to generate a memory read request signal S12 to the memory interface 2 with reference to the valid bit corresponding to the low order six bits of the output address from the address shifter 6, the decoding result of the address decoder 5, the comparison result of the comparator 10 as a matching signal S10, and the memory read request signal as output from the processor 4. The control circuit 13 serves to generate a writing signal S13a for initializing the valid bits and writing an appropriate address on the block address storing register 9 and a writing signal S13b for writing the valid bit of the buffer memory 8 corresponding to the low order bits of the output address from the address shifter 6 in accordance with the compressed/native instruction discrimination signal S5 as the decoding result of the address decoder 5, the memory read request signal S12 as the output signal of the memory read request control circuit 12, the matching signal S10 as the output of the comparator 10. The address range of the compressed instruction codes A1, A2, A3 . . . and the address range of the compressed instruction codes B1, B2, B3 . . . are distinguished by the processor address CA4 as output from the processor 4.

Next, the sequence from fetching compressed instruction codes to executing the corresponding native instruction codes will be explained with reference to FIG. 19 which is a timing chart of accessing to the compressed instruction code address range and FIG. 20 which is a timing chart of accessing to the native instruction code address range.

For example, it is assumed that, when the 32-bit processor address CA4 as output from the processor 4 for fetching an instruction code falls in 00000000h to 3FFFFFFFh, the instruction codes is treated as a compressed instruction code while, when the 32-bit processor address CA4 falls in the remaining address range, the instruction codes is treated as a native instruction code. As illustrated in FIG. 18 compressed instruction codes A1, A2, A3, A4 . . . are stored in the addresses from 00000900h while native instruction codes B1, B2, B3 . . . are stored in the addresses from 40000000h in advance. When the 32-bit processor address CA4 as output from the processor 4 for fetching an instruction code is 00001204h, the address decoder 5 judges that the processor address CA4 falls in the compressed instruction code address range, and therefore the address shifter 6 generates an address of 00000902h by shifting the processor address CA4 to the right and outputs the address as shifted to the memory interface 2, which then transfers the address of 00000902h to the program memory 1. The compressed instruction code A2 is read out from the address of 00000902h of the program memory 1 and transferred to the instruction code conversion circuit 7 through the memory interface 2. Since the compressed instruction code address range judges that the processor address CA4 falls in the compressed instruction code address range, the instruction code conversion circuit 7 converts the compressed instruction code A2 to the corresponding 32-bit native instruction code C2. The native instruction code C2 is transferred to the processor 4 which then executes the instruction code C2.

When executing the instruction code C2, the processor 4 increments the address to 00001208h. If the instruction code C2 is such an instruction which changes the flow of the program, e.g., a branch instruction, an exception invoking instruction and so forth, the processor 4 outputs the destination address and the like as the next address. The compressed instruction codes A3 as read from the address of 00001208h is converted into the instruction code C3, which is then executed by the processor 4, in the same sequence as from the address of 00001204h.

Next, explanation is made in the case where the 32-bit processor address CA4 as output from the processor 4 for fetching an instruction code is 40000000h. The address decoder 5 judges that the processor address CA4 falls in the native instruction code address range, and therefore address shifter 6 transfers the address of 40000000h without shift to the memory interface 2, which then transfers the address of 40000000h to the program memory 1. The native instruction code B1 is read out from the address of 40000000h of the program memory 1, received by the memory interface 2 and transferred to the instruction code conversion circuit 7. Since the address of 40000000h is judged to fall in the native instruction code address range, the instruction code conversion circuit 7 transfers the native instruction code B1 to the processor 4 without conversion. The processor 4 then executes the native instruction coda B1.

Unless the native instruction code B1 is not an instruction which changes the flow of the program, the processor 4 increments the processor address CA4 by +4 from the address of 40000000h to the address of 40000004h. The instruction code B2 as read from the address of 40000004h is transferred to the processor 4 and then executed by the processor 4, in the same sequence as from the address of 40000000h. In this manner, since only native instruction codes are transferred to the processor 4, it is not necessary to modify the hardware of the processor.

The block address storing register 9 can be designed to store the processor address CA4 rather than the memory address of MA6 as the output signal of the address shifter 6. In this case, the comparator 10 is designed to compare the high order bits of the processor address CA4 with the block address BA9 as the output signal of the block address storing register 9.

The selector circuit 11 may be composed of a multiplexer for selecting one of the instruction code OC8 as read from the buffer memory 8 and the instruction code OC7 as outputted from the instruction code conversion circuit 7 in accordance with the compressed/native instruction discrimination signal S5 as the output signal of the address decoder 5. Also, the selector circuit 11 may be composed of a multiplexer which is controlled in accordance with the memory read request signal S12, as the output signal of the memory read request control circuit 12 as illustrated in FIG. 21.

The buffer memory 8 is provided for dispensing with access to the program memory 1 to read out the compressed instruction codes A1, A2, A3 . . . in the case where the native instruction codes C1, C2, C3 . . . as required has been already stored in the buffer memory 8 in order to quickly transfer the native instruction codes C1, C2, C3 . . . to the processor 4. In order to judge whether or not the native instruction code as required has been already stored in the buffer memory 8, the program memory 1 is divided into a plurality of blocks of a predetermined size (for example, the size is capable of storing 32 instructions of 16-bit instruction codes). The block address storing register 9 serves to store the high order bits of the address of the block (in this case, 32 bits–6 bits=26 bits). In advance of storing the high order bits of the address of the block to the block address storing register 9, the block address BA9 as the output signal of the block address storing register 9 is compared with the high order bits of the memory address of MA6 as the output signal of the address shifter 6 by means of the comparator 10. If they are not matched, the high order bits of the address of the block is stored in the block address storing register 9 while the valid bit corresponding to the low order bits (six bits in this case) of the memory address of MA6 of the output signal of the address shifter 6 are set to "1" and the remaining valid bits is set to "0". The block address storing register 9 and the valid bits are written when the compressed instruction code is read out through the memory interface 2, converted and stored to the buffer memory 8. On the other hand, if the block address storing register BA9 is matched with the high order bits of the memory address of MA6, the block address storing register 9 may not be rewritten. However, the valid bits are treated as follows. Namely, in the case where the valid bit corresponding to the instruction code as required has been already set to "1", the native instruction code as required is read out from the address of the buffer memory 8 corresponding to the low order bits of the memory address of MA6 which is the output signal of the address shifter 6 without outputting the memory read request signal to the memory interface 2 for accessing the program memory. Meanwhile, access to the buffer memory 8 is initiated at the same time as the valid bit is checked in order to reduce the processing time. If the valid bit is "0", the instruction code as read from the buffer memory 8 is discarded. Also, in the case where the valid bit is "0", the memory read request signal is output to the memory interface 2 in order to read a compressed instruction code, which is then converted into the corresponding native instruction code(s) and stored in the buffer memory 8. The valid bit is set to "1" when the corresponding native instruction code is stored in the buffer memory 8.

In the above described embodiment, there may be provided, for the purpose of improving the efficiency of coding, one or more area designation register with which the compressed instruction code address range can be adjusted by a program. It is possible to continuously locate the compressed instruction code address range and the native instruction code address range without a useless address space therebetween. In this case, the address decoder 5 serves to compare the processor address CA4 with the above described area designation register rather than to decode an address with reference to the addresses of 00000000h to 3FFFFFFFh.

Meanwhile, in order not to perform expansion of compressed instruction codes in a start-up routine, the default value of the above described area designation register is determined in order that the reset handler program shall not fall in the compressed instruction code address range. Alternatively, there may be provided another initialization register for initialization. The initialization register is a compressed instruction code enabling register with which expansion of compressed instruction codes is enabled or disabled. The initialized value of the compressed instruction code enabling register is disabled. In the case where the processor 4 is in a debugging mode, the compressed instruction code enabling register may be set disabled, while the native instruction codes of the target program are stored in the program memory 1, in order to makes it possible to use existing debugging devices and existing debuggers.

If compressed instruction codes are loaded to the program memory 1 for debugging, there may be provided an instruction code inverse conversion circuit in the instruction code conversion unit 3 for performing compression (i.e., a native instruction code as given is converted into the corresponding compressed instruction code) for the purpose of lessening the load on the debugger.

Next, in order to further improve the efficiency of coding for the foregoing embodiment, the configuration of the instruction code conversion unit 3 as illustrated in FIG. 18 is modified in order to treat mixed sequences of 16-bit instruction codes and 32-bit instruction codes 32 rather than only the 16-bit fixed compressed instruction code sequences. FIG. 22 and FIG. 23 are block diagrams showing the entire configuration of an exemplary information processing system capable of handling mixed sequences of 16-bit instruction codes and 32-bit instruction codes 32. In the figures, FIG. 22 and FIG. 23 are interconnected at ※1 and ※2.

The 32-bit compressed instruction code are composed of the high order 16 bits of IH1, IH2, IH3 . . . and the lower 16 bits of IL1, IL2, IL3 . . . . The high order 16 bits and the lower 16 bits (e.g., IH1 and IL1) are paired to be a 32-bit compressed instruction code. On the other hand, the native instruction codes of the processor 4 corresponding to the 32-bit compressed instruction codes are DH1/DL1, DH2/DL2, DH3/DL3 . . . (32 bits×2 for one 32-bit compressed instruction code). The native instruction codes of the processor 4 corresponding to the 16-bit instruction codes A1, A2, A3 . . . are C1, C2, C3 . . . in the same manner as in the above embodiment. The bit length of a compressed instruction is determined by decoding the high order 6 bits of the high order 16 bits of a 32-bit compressed instruction code or the high order 6 bits of a 16-bit compressed instruction code. For example, the bit length of a compressed instruction is determined as 32 bits when the high 6 bits is 000000b to 000011b or 010011b (binary number) and as 16 bits when the high 6 bits is 000100b to 010010b of 011000b. Exemplary compressed instruction codes and the 32-bit native instruction codes which are obtained by expanding the exemplary compressed instruction codes are as illustrated in FIG. 6.

The compressed instruction code address range of the program memory 1 is divided into a plurality of blocks each accommodating 32 instructions of 16-bit codes, which are generated by a compression software as described above in order that the leading bits of each block are occupied by high order bits of the compressed instruction codes and that data is not included in each block. The instruction code conversion unit 30 in accordance with this embodiment is provided with a two-block buffer memory consisting of two buffer memory blocks 8a and 8b in place of the single block buffer memory 8 of the instruction code conversion unit 3 as described above, and two block address storing registers 9a and 9b in place of the single block address storing register 9 of the instruction code conversion unit 3. The instruction code conversion unit 30 is provided further with an address generator 14, selector circuits 17, 20 and 22, control circuits 21 and 23, a selector circuit 25, comparator circuits 26, 10a and 10b, high order bits storing registers 16a and 16b, a code length detection circuit 18, code length storing circuits 19a and 19b, effective address storing registers 24a and 24b and a buffer memory designation register 27.

The address generator 14 serves to generate an address MA14 to be transferred to the memory interface 2. The selector circuit 17 serves to select the contents of the high order bits storing registers 16a and 16b in accordance with the output signal S27 of the buffer memory designation register 27. The selector circuit 20 serves to select the contents of the code length storing circuits 19a and 19b in accordance with the output signal S27 of the buffer memory designation register 27. The selector circuit 22 serves to select the contents of the buffer memory blocks 8a and 8b in accordance with the output signal S27 of the buffer memory designation register 27. The control circuit 21 serves to generate a selection signal S21 given to the selector circuit 11 and the control circuit 15 which serves to generate the writing signals S15a and S15b of the high order bits storing registers 16a and 16b. The control circuit 23 serves to generate the reset signals S23a and S23b and the counting up signals S23c and S23d of the effective address storing registers 24a and 24b and the counting up signal S23e of the address generator 14. The selector circuit 25 serves to select the contents SA24a and SA24b of the effective address storing registers 24a and 24b in accordance with the output signal S27 of the buffer memory designation register 27. The comparator circuit 26 serves to compare the output signal A25 of the selector circuit 25 with the low order bits of the output address MA6 of the address shifter 6 to determine which is greater. The comparator circuits 10a and 10b serves to compare the addresses BA9a and BA9b contained in the block address storing registers 9a and 9b with the high order bits of the address MA6 to determine matching therebetween. The high order bits storing registers 16a and 16b serves to store the instruction code OC2 read through the memory interface 2 in the case where the instruction code OC2 is the high order 16 bits of a 32-bit compressed instruction code. The code length detection circuit 18 serves to detect if the instruction code OC2 read through the memory interface 2 is the high order 16 bits of a 32-bit compressed instruction code. The code length storing circuits 19a and 19b serves to store the information of whether the instruction code OC2 read through the memory interface 2 is a 16-bit instruction code or a 32-bit instruction code. The effective address storing registers 24a and 24b are indicative of the addresses of the buffer memory blocks 8a and 8b to which address expanded instruction codes are stored in the buffer memory block from the top addresses respectively. The buffer memory designation register 27 serves to which buffer memory block 8a or 8b should be used next.

The compressed instruction code address range of the program memory 1 is divided into a plurality of blocks each of which accommodating 32 instructions of 16-bit instruction codes (512 bits=64 bytes) so that each of the buffer memory blocks 8a and 8b accommodates 32 instructions of 32-bit instruction codes (1024 bits=128 bytes). The effective address storing register 24a or 24b serves to indicate, if it is set to "0", that no valid native instruction code is stored in the buffer memory block 8a or 8b, and is incremented by +2 in response to the counting up signal S23c or S23d as described above. Accordingly, when all the 1024 bits of the buffer memory block 8a or 8b are filled with valid native instructions. 32d×2d=63d (decimal number) is set to the effective address storing register 24a or 24b. On the other hand, when the buffer memory designation register 27 is "0", the buffer memory block 8a, the block address storing register 9a, the effective address storing register 24a and the code length storing circuit 19a are respectively selected.

Next, the sequence from fetching compressed instruction codes to executing the corresponding native instruction codes will be explained.

When the processor 4 accesses to an address in the compressed instruction code address range of the program memory 1 and the address decoder 5 judges that the address falls in the compressed instruction code address range, the processor address CA4 is shifted to the right and outputted as the address MA6 by the address shifter 6. The comparator circuits 10a and 10b serve to compare the contents of the block address storing registers 9a and 9b corresponding to the respective buffer memory blocks 8a and 8b respectively with the high order bits of said address MA6 as the high order bits of the address of a block corresponding to the size of the buffer memory, and check if there is a hit. If there is a hit, the content of the effective address storing register 24a or 24b as hit is checked. In the case where the effective address storing register as hit is "0", a compressed instruction code is read out from the top address of said block. Namely, the compressed instruction code IH1, IH2, IH3 . . . or the compressed instruction codes A1, A2, A3 . . . is read out from the program memory 1 by setting the top address of said block to the output signal of the address generator 14 as the memory address of MA14 and transferring the top address of said block to the memory interface 2.

If there is not a hit, the compressed instruction code IH1, IH2, IH3 . . . or the compressed instruction codes A1, A2, A3 . . . is read out from the program memory 1 in the same manner.

At this time, the top address of said block is set to either the block address storing register 9a or 9b which is selected by the buffer memory designation register 27 while either the effective address storing register 24a or 24b which is also selected by the buffer memory designation register 27 is cleared to "0". The code length detection circuit 18 then decodes the high order 6 bits of the compressed instruction code as read out in order that judge whether the bit length of the compressed instruction codes is 16 bits or 32 bits. The result of judgment is set to the code length storing circuit 19a or 19b which is selected by the buffer memory designation register 27. The result of judgment is 00b (binary number) in the case of 16 bits and 10b (binary number) in the case of 32 bits. The code length storing circuit 19a or 19b serves to maintain 00b while handling a 16-bit instruction code, to maintain 10b while handling the high order 16 bits of a 32-bit compressed instruction code and to maintain 11b while handling the low order 16 bits of a 32-bit compressed instruction code.

If the compressed instruction code as read is a 16-bit compressed instruction code (A1, A2, A3 . . . ), the compressed instruction code is converted by means of the instruction code conversion circuit 7 and stored in either the buffer memory block 8a or 8b which is selected by the buffer memory designation register 27. After the native instruction code is stored, the effective address storing register 24a or 24b which is selected by the buffer memory designation register 27 is incremented by +2. If the compressed instruction code as read is the high order 16 bits of a 32-bit compressed instruction code (IH1, IH2, IH3 . . . ), the high order 16 bits (IH1, IH2, IH3 . . . ) are stored in either the high order bits storing register 16a or 16b which is selected by the buffer memory designation register 27. The top address of the block are incremented by +2 by means of the address generator 14 is used for accessing the program memory 1 through the memory interface 2 in order to read the low order 16 bits of the 32-bit compressed instruction code, while the content of the code length storing circuit 19a or 19b which is selected by the buffer memory designation register 27 is updated from 00b to 10b. The low order 16 bits (IL1, IL2, IL3 . . . ) of the 32-bit compressed instruction code are read out from the program memory 1 and are transferred to the instruction code conversion circuit 7.

The instruction code conversion circuit 7 serves to combine the high order 16 bits of the 32-bit compressed instruction code as read out first with the low order 16 bits thereof as read out latter, convert the 32-bit compressed instruction code in combination into at least two 32-bit native instruction codes (either pair of DH1/DL1, DH2/DL2, DH3/DL3 . . . ) and store the two 32-bit native instruction codes in the buffer memory block 8a or 8b which is selected by the buffer memory designation register 27. At the same time as storing the two 32-bit native instruction codes, the effective address storing register 24a or 24b which is selected by the buffer memory designation register 27 is incremented by +4.

The comparator circuit 26 then serves to compare the content of the effective address storing register 24a or 24b which is selected by the buffer memory designation register 27 with low order 6 bits of the address (because the size of the buffer memory block 8a or 8b accommodates 32 16-bit instructions) obtained by shifting the processor address for fetching an instruction by 1 bit to the right, while the compressed instruction codes are repeatedly read out from the program memory 1 through the memory interface 2, converted into the corresponding native instruction codes by means of the instruction code conversion circuit 7, and stored in the buffer memory block 8a or 8b which is selected by the buffer memory designation register 27, followed by updating the effective address storing register 24a or 24b which is selected by the buffer memory designation register 27. On the basis of the result of comparison, the address generator 14 increments its output address by +2 in response to the counting up signal S23e until the low order 6 bits of the address as shifted becomes smaller than the content of the effective address storing register 24a or 24b which is selected by the buffer memory designation register 27.

When the low order 6 bits of the address becomes smaller than the content of the selected effective address storing register 24a or 24b, the compressed instruction code as required by the processor 4 has been read out from the program memory 1 through the memory interface 2, converted into the corresponding native instruction codes by means of the instruction code conversion circuit 7 and stored in the buffer memory block 8a or 8b. The compressed instruction code as required by the processor 4 is then is transferred to the processor 4 from the instruction code conversion circuit 7 for execution. While the native instruction code is executed, the compressed instruction codes of the current block are continuously read out from the program memory 1, converted into the corresponding native instruction codes, and stored in the buffer memory block 8a or 8b. On the other hand, when the processor 4 executes the native instruction code, the processor address CA4 is updated. The content of the block address storing register 9a or 9b is compared with the high order bits (other than the low order 6 bits) of the processor address shifted to the right by the address shifter 6 for the purpose of determining whether or not the processor address CA4 falls in a block of which part or all of the instruction codes have been converted. Namely, if the result of comparison indicates a match, it is determined that the processor address CA4 falls in the block followed by storing a value to the buffer memory designation register 27 in order to indicate one of the buffer memory blocks 8a and 8b corresponding to the match. If the result of comparison indicates no match, it is determined that the processor address CA4 points an address outside of the block followed by storing a value to the buffer memory designation register 27 in order to indicate one of the buffer memory blocks 8a and 8b other than that is lastly used.

Most of native instruction codes which are executed by the processor 4 are not such instruction which change the flow of the program and therefore, in many case, the instruction as required by the processor 4 has been stored in the buffer memory block 8a or 8b. The native instruction code as required is therefore read out from the buffer memory block 8a or 8b with reference to the effective address storing register 24a rather than from the program memory 1 in the form of a corresponding compressed instruction code by outputting the access request to the memory interface 2. However, the control is sometimes transferred to an address outside of the block after execution of a branch instruction, occurrence of an exception or the like. In the case where the control is transferred to an address outside of the block, it is immediately halted to perform the operation with the previous block, i.e., that the compressed instruction codes are repeatedly read out from the program memory 1 through the memory interface 2, converted into the corresponding native instruction codes, and stored in the buffer memory block 8a or 8b. Even if the operation with the previous block is halted, the buffer memory block 8a or 8b stores the instruction code(s) as converted unless it is not overridden and therefore, when the control is returned to the previous block, the expansion process can be resumed from the point as interrupted, resulting in reducing the time required for expansion. The reduction of time can be more effective by separately providing a plurality of buffer memory blocks for the main routine, for exception handers and for subroutines as explained heretofore. While these buffer memories are not illustrated in the present embodiment, it is desired to provide such a buffer memory as accommodating at least six blocks.

In the case where a 32-bit compressed instruction code is converted into a 32-bit "NOP" instruction code and a 32-bit native instruction code, the instruction code conversion circuit 7 detects the 16 bits as currently read as the high order 16 bits of a 32-bit compressed instruction code (IH1, IH2, IH3 . . . ) by decoding part of the 16 bits followed by generating the 32-bit "NOP" instruction which is then stored in the buffer memory block 8a or 8b. The low order 16 bits of the 32-bit compressed instruction code (IL1, IL2, IL3 . . . ) are then read from the program memory 1, converted in combination with the high order 16 bits thereof (IH1, IH2, IH3 . . . ) into a 32-bit native instruction code (DL1, DL2, DL3 . . . ) and stored in the buffer memory block 8a or 8b. For example, assuming that the high order 16 bits IH1 and the low order 16 bits LH1 of a 32-bit compressed instruction code IL1 are stored in the address 00000002h and the address 00000004h of the program memory 1 respectively, the 32-bit "NOP" instruction code is stored in the address 04h of the buffer memory block 8a or 8b while the 32-bit instruction code DL1 is stored in the address 08h of the buffer memory block 8a or 8b.

Meanwhile, the 32-bit "NOP" instruction code and the 32-bit instruction code DL1 can be stored in the buffer memory block 8a or 8b in the reverse order. Namely, the 32-bit "NOP" instruction code can be executed first followed by the 32-bit instruction code DL1 and vice versa. The effective order may be determined in accordance with the architecture of the processor 4. Alternatively, the order of the 32-bit "NOP" instruction code and the 32-bit instruction code DIL1 can be dynamically changed by taking into consideration an adjacent instruction code sequence preceding and/or following the 32-bit "NOP" instruction code and the 32-bit instruction code DL1. Also, the efficiency of coding can be improved by expanding a compressed instruction into two native instruction codes DH1 and DL1 each of which is not the 32-bit "NOP" instruction.

In the case of the above described embodiment, there is the restriction that no 32-bit compressed instruction code can not be located bridging adjacent blocks However, as a further embodiment of the present invention, there can be provided in the program memory, separate from the program, the bit length information indicative of whether the bit length of the compressed instruction codes is 16 bits or 32 bits in this case, it is possible that a 32-bit compressed instruction code is located bridging adjacent blocks. For example, bit length information of 32 bits (one bit per 16-bit instruction code) are provided for each block in order that a "0" bit is provided for a 16-bit compressed instruction code and the high order 16 bits of a 32-bit compressed instruction code while a "1" bit is provided for the low order 16 bits of a 32-bit compressed instruction code. It is therefore possible to detect a 32-bit compressed instruction code bridging adjacent blocks by accessing the bit length information. If the control is returned to the low order 16 bits of a 32-bit compressed instruction code, correct conversion is possible by detecting this fact followed by reading the high order 16 bits from the preceding address so that there is no penalty of resuming the process from the top of the block. However, there are consumed an extra memory space of 32 bits (4 bytes) per 32 compressed instruction codes (16 bits×32 instructions=64 bytes). Namely, 32 bits×32 instructions=128 bytes is increased to 132 bytes in the worst case while 16 bits×32 instructions=64 bytes is increased to 68 bytes in the best case.

The information penalty may be lessened by providing bit length information of two bits per 16-bit instruction code in order that a "01" is provided for a 16-bit compressed instruction code, a "10" is provided for the high order 16 bits of a 32-bit compressed instruction code and a "11" bit is provided for the low order 16 bits of a 32-bit compressed instruction code. In this case, since the 16-bit instruction compressed codes and the 32-bit codes instruction codes can be distinguished by the two-bit information, the 16-bit instruction compressed codes and the 32-bit codes instruction codes can share the same opcodes. By the use of this fact, the usage of the 16-bit instruction codes respective to the 32-bit instruction codes in a program can be increased. If most of the instruction codes in a program are 16-bit instruction codes, the size of the program per block is nearly 64 bytes+8 bytes=72 bytes. Accordingly, in this case, the peak of the efficiency of coding is improved by a compression rate of 72/128=56.25%.

If the bit length information is recognized part of an instruction code, this technique is recognized as the above described encoding method in which the bit length of an instruction is determined by decoding any part of a 32-bit native instruction code as fetched as illustrated in FIG. 8(b).

In this manner, in accordance with the above described embodiment, the interrelation between the program memory address and the processor address is simplified by the use of a simple bit shifting operation to makes it possible to dispense with the correspondence information such as an index table for address conversion, resulting in the advantage in costs and in the time for expanding instructions. Also, the shifter circuit can be composed of a multiplexer so that the address conversion can be completed within one nanosecond while in accordance with a conventional technique making use of an index table it takes from several nanoseconds to several hundreds of nanoseconds depending upon the memory type to perform the address conversion.

Furthermore, while the structural characteristics of the target programs are depending upon the system implemented with the processor in accordance with the present invention is applied, it is possible in accordance with the present invention to improve the efficiency of coding by providing an effective compressed instruction set which is designed suitable the application system and different from compressed instruction sets having been designed for other application systems. This customization is very easy as compared with conventional techniques since the instruction codes are converted in a location outside of the processor.

As a modification, the correspondence information between the compressed instruction codes to be expanded and the native instruction codes after expansion may be written in an instruction code conversion table memory, which is added to the instruction code conversion circuit 7 of the instruction code conversion unit 3 or 30. For example, in the case where the instruction code conversion table memory is a mask ROM, the correspondence information is written in the manufacturing production line of the mask ROM. Also, in the case where the instruction code conversion table memory is a rewritable memory such as an SRAM or flip-flops, the correspondence information is written in advance of the expansion by a program executed by the processor 4. All or part of the compressed instruction codes are converted into the corresponding native instruction codes with reference to the correspondence information stored in the instruction code conversion table memory. By the use of this configuration, the efficiency of coding is furthermore improved by assigning shorter compressed instruction codes to the native instruction codes which are frequently executed in the target program. Different correspondence information instances can be provided for different program. Also, a single program can use different correspondence information instances switchingly while running.

Furthermore, it is possible to improve the efficiency of coding and reduce the required capacity of the program memory at the cost of the execution speed. Such system applications of the present invention as requiring reduction in memory capacity include the system requiring a memory capacity larger than the inherent memory space of the processor. An example of such processors of this kind is a processor which has an internal memory space of 32 bits but only has a 28-bit address bus. In this case, a program requiring an address space exceeding 28 bits may be implemented within the address space of 28 bits by the use of compression.

Furthermore, it is possible to reduce the entire cost of a system in accordance with the present invention which is implemented with an expensive memory by reducing the memory capacity. In accordance with the present invention, the costs of a system can be reduced by improving the efficiency of coding, i.e., reducing the number of memory chips of the program memory and costs associated with assembling/testing/circuit board/wirings of the system. In the case of a built-in program memory, a larger program can be implemented within the built-in program memory. Also, the chip size can be reduced when the memory capacity of the built-in program memory is reduced resulting in a smaller package. The reliability and the performance can be improved by the reduction in the chip size.

On the other hand, the present invention is effective for such a system in which the bus width of the program memory is restricted while a higher execution speed is desirable. For example, the program memory is connected through a 16-bit bus so that it takes two bus cycles to fetch each of 32-bit native instruction codes. In such a case, one instruction can be fetched in one bus cycle by the use of 16-bit compressed instruction codes resulting in a shorter total execution time.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. An information processing system comprising:
a processor capable of executing native instruction codes;
a program memory for storing a program at least part of which comprises compressed instruction codes;
an instruction code conversion unit connected to said processor and said program memory for receiving an address of a native instruction code as outputted from said processor, converting the address of said native instruction code to an address of a corresponding compressed instruction code in said program memory, reading out said compressed instruction codes from the address of said compressed instruction code as converted, converting said compressed instruction code to said native instruction code as converted, and transferring said native instruction to said processor, wherein said instruction code conversion unit performs conversion of the address of said native instruction code to the address of a corresponding compressed instruction code in said program memory by shifting the address of said native instruction code as outputted from said processor to the right by 1 bit.

2. The information processing system as claimed in claim 1 wherein said instruction code conversion unit accesses to said program memory through a memory interface.

3. The information processing system as claimed in claim 1 wherein said compressed instruction codes are m-bit fixed-length codes or m-bit/n-bit (n≧m) variable-length codes while said native instruction codes are n-bit fixed-length codes, where n and m are defined as an integer greater than 0.

4. The information processing system as claimed in claim 1 wherein said program memory includes a compressed instruction code address range for storing said compressed instruction codes and a native instruction code address range for storing said native instruction codes while the addresses of the native instruction codes as outputted from said processor are used as means for distinguishing between said compressed instruction codes and said native instruction codes.

5. The information processing system as claimed in claim 1 wherein said compressed instruction codes are variable-length codes; and wherein said program as stored in said program memory is divided into a plurality of memory blocks of said compressed instruction codes in order that leading bits of each memory block are occupied by high order bits of each corresponding compressed instruction code.

6. The information processing system as claimed in claim 1 wherein said instruction code conversion unit is provided with a buffer memory for storing the native instruction codes as converted by said instruction code conversion unit.

7. The information processing system as claimed in claim 6 wherein said buffer memory is composed of a plurality of buffer memory blocks each of which accommodates native instruction codes corresponding to said compressed instruction codes with which one memory block is filled; and wherein each buffer memory block is provided with a block address storing register for storing information indicative of the addresses of the native instruction codes stored therein.

8. The information processing system as claimed in claim 7 wherein said information processing system is provided with a comparator circuit for comparing the addresses of the native instruction codes as stored in said buffer memory blocks with the address of the native instruction code as outputted from said processor.

9. The information processing system as claimed in claim 7 wherein said information processing system is provided with a register indicative of whether or not the information stored in said block address storing register is valid.

10. An instruction code conversion unit connected to a processor capable of executing native instruction codes and a program memory for storing a program at least part of which comprises compressed instruction codes, receiving an address of a native instruction code as outputted from said processor, converting the address of said native instruction code to an address of a corresponding compressed instruction code in said program memory, reading out said compressed instruction codes from the address of said compressed instruction code as converted, converting said compressed instruction code to said native instruction code as converted, and transferring said native instruction to said processor, wherein said instruction code conversion unit performs conversion of the address of said native instruction code to the address of the corresponding compressed instruction code in said program memory by shifting the address of said native instruction code as outputted from said processor to the right by 1 bit.

11. An instruction code generation method comprising:

a step of assembling a source program with a subset of native instruction codes in order to generate an assembler source program;

a step of converting said assembler source program to a relocatable object;

a step of converting said relocatable object to an absolute object file consisting of said native instruction codes;

a step of converting said absolute object file consisting of said native instruction codes to an absolute object file consisting of compressed instruction codes by shifting addresses of said native instruction codes written in said absolute object file consisting of said native instruction codes by 1 bit to the right and converting said native instruction codes to said compressed instruction codes; and a step of converting said absolute object file consisting of said compressed instruction codes to an object program loadable to a program memory.

* * * * *